United States Patent
Bonalle et al.

(10) Patent No.: US 7,172,112 B2
(45) Date of Patent: Feb. 6, 2007

(54) PUBLIC/PRIVATE DUAL CARD SYSTEM AND METHOD

(75) Inventors: David S. Bonalle, New Rochelle, NY (US); Aliza Freud, Maplewood, NJ (US); Jason E. Nanton, Nanuet, NY (US); Mary Ann Fitzmaurice Reilly, Nanuet, NY (US); Ray Sharp, Coral Springs, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 146 days.

(21) Appl. No.: 10/709,815

(22) Filed: May 28, 2004

(65) Prior Publication Data

US 2005/0035192 A1    Feb. 17, 2005

Related U.S. Application Data

(63) Continuation-in-part of application No. 09/764,688, filed on Jan. 16, 2001, now Pat. No. 6,742,704.

(60) Provisional application No. 60/177,530, filed on Jan. 21, 2000.

(51) Int. Cl.
*G06Q 40/00* (2006.01)
(52) U.S. Cl. ..................... 235/379; 380/384
(58) Field of Classification Search ................ 235/379, 235/380, 381, 384
See application file for complete search history.

(56) References Cited

U.S. PATENT DOCUMENTS 3,376,661 A    4/1968    Hulett
4,066,873 A    1/1978    Schatz
4,303,904 A    12/1981   Chasek (Continued)

FOREIGN PATENT DOCUMENTS

CH    689070    8/1998

(Continued)

OTHER PUBLICATIONS

"What's New: Timex Watch Features Speedpass System", http://www.speedpass.com/news/article.jsp?id=51.

(Continued)

*Primary Examiner*—Ahshik Kim
(74) *Attorney, Agent, or Firm*—Fitzpatrick, Cella, Harper & Scinto

(57) ABSTRACT

A system and method for providing a multiple-service card is disclosed. A card member 108 is provided with a single card that serves as both an open transaction instrument and a private retailer transaction instrument. This multiple-service card may have the traditional credit card data on one side of the card, including, for example, the account number, name of the account holder, and the expiration date. The other side of the card may include a magnetic stripe that contains the account information in machine readable form as well as private retailer transaction instrument information. In the system, the primary party and the service partner participants cooperate to complete the processes associated with the provision of the combined card services, including a new account process, card replacement and renewal processes, a service partner cancellation process, and a process for cancellation and/or transfer by a primary party.

32 Claims, 16 Drawing Sheets

U.S. PATENT DOCUMENTS

| | | |
|---|---|---|
| 4,318,554 A | 3/1982 | Anderson et al. |
| 4,443,027 A | 4/1984 | McNeely et al. |
| 4,475,308 A | 10/1984 | Heise et al. |
| 4,583,766 A | 4/1986 | Wessel |
| 4,593,936 A | 6/1986 | Opel |
| 4,639,765 A | 1/1987 | dHont |
| 4,663,518 A | 5/1987 | Borror et al. |
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,961,142 A | 10/1990 | Elliott et al. |
| 4,998,753 A | 3/1991 | Wichael |
| 5,023,782 A | 6/1991 | Lutz et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | IngSimmons et al. |
| 5,247,304 A | 9/1993 | dHont |
| 5,259,649 A | 11/1993 | Shomron |
| 5,274,392 A | 12/1993 | dHont et al. |
| 5,276,311 A | 1/1994 | Hennige |
| 5,285,100 A | 2/1994 | Byatt |
| 5,305,002 A | 4/1994 | Holodak et al. |
| 5,308,121 A | 5/1994 | Gunn |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | dHont et al. |
| 5,371,896 A | 12/1994 | Gove et al. |
| 5,373,303 A | 12/1994 | dHont |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove |
| 5,428,363 A | 6/1995 | dHont |
| 5,453,747 A | 9/1995 | dHont et al. |
| 5,471,592 A | 11/1995 | Gove et al. |
| 5,477,040 A | 12/1995 | Lalonde |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,651 A | 3/1996 | Schuermann |
| 5,503,434 A | 4/1996 | Gunn |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,534,857 A | 7/1996 | Laing et al. |
| 5,541,604 A | 7/1996 | Meier |
| 5,543,798 A | 8/1996 | Schuermann |
| 5,544,246 A | 8/1996 | Mandelbaum et al. |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,569,897 A | 10/1996 | Masuda |
| 5,572,226 A | 11/1996 | Tuttle |
| 5,577,109 A | 11/1996 | Stimson et al. |
| 5,578,808 A * | 11/1996 | Taylor ........................ 235/380 |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | dHont |
| 5,592,405 A | 1/1997 | Gove et al. |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,721,781 A | 2/1998 | Deo et al. |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,748,137 A | 5/1998 | dHont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,609 A | 6/1998 | Gove et al. |
| 5,774,882 A | 6/1998 | Keen et al. |
| 5,777,903 A | 7/1998 | Piosenka |
| 5,778,067 A | 7/1998 | Jones et al. |
| 5,785,680 A | 7/1998 | Niezink et al. |
| 5,792,337 A | 8/1998 | Padovani et al. |
| 5,793,324 A | 8/1998 | Aslanidis et al. |
| 5,794,095 A | 8/1998 | Thompson |

| | | | | | | |
|---|---|---|---|---|---|---|
| 5,797,060 | A | 8/1998 | Thompson | 6,012,049 | A | 1/2000 | Kawan |
| 5,797,085 | A | 8/1998 | Buek et al. | 6,012,636 | A | 1/2000 | Smith |
| 5,797,133 | A | 8/1998 | Jones et al. | 6,014,645 | A | 1/2000 | Cunningham |
| 5,798,709 | A | 8/1998 | Flaxl | 6,016,476 | A | 1/2000 | Maes et al. |
| 5,809,142 | A | 9/1998 | Hurta et al. | 6,018,717 | A | 1/2000 | Lee et al. |
| 5,809,288 | A | 9/1998 | Balmer | 6,024,286 | A | 2/2000 | Bradley et al. |
| 5,809,633 | A | 9/1998 | Mundigl et al. | 6,029,149 | A | 2/2000 | Dykstra et al. |
| 5,825,007 | A | 10/1998 | Jesadanont | 6,029,892 | A | 2/2000 | Miyake |
| 5,825,302 | A | 10/1998 | Stafford | 6,032,136 | A * | 2/2000 | Brake et al. .................. 705/41 |
| 5,826,077 | A | 10/1998 | Blakeley et al. | 6,038,292 | A | 3/2000 | Thomas |
| 5,826,243 | A | 10/1998 | Musmanno et al. | 6,038,584 | A | 3/2000 | Balmer |
| 5,828,044 | A * | 10/1998 | Jun et al. .................... 235/380 | 6,047,888 | A | 4/2000 | Dethloff |
| 5,834,756 | A | 11/1998 | Gutman et al. | 6,052,675 | A | 4/2000 | Checchio |
| 5,841,364 | A | 11/1998 | Hagl et al. | 6,064,320 | A | 5/2000 | dHont et al. |
| 5,842,088 | A | 11/1998 | Thompson | 6,068,184 | A | 5/2000 | Barnett |
| 5,844,218 | A | 12/1998 | Kawan et al. | 6,070,003 | A | 5/2000 | Gove et al. |
| 5,844,230 | A * | 12/1998 | Lalonde ..................... 235/487 | 6,072,870 | A | 6/2000 | Nguyen et al. |
| 5,845,267 | A | 12/1998 | Ronen | 6,073,840 | A | 6/2000 | Marion |
| 5,851,149 | A | 12/1998 | Xidos et al. | 6,078,888 | A | 6/2000 | Johnson, Jr. |
| 5,854,891 | A | 12/1998 | Postlewaite et al. | RE36,788 | E | 7/2000 | Mansvelt et al. |
| 5,858,006 | A | 1/1999 | Van der AA et al. | 6,085,976 | A | 7/2000 | Sehr |
| 5,859,419 | A | 1/1999 | Wynn | 6,088,686 | A | 7/2000 | Walker et al. |
| 5,859,779 | A | 1/1999 | Giordano et al. | 6,089,611 | A | 7/2000 | Blank |
| 5,864,323 | A | 1/1999 | Berthon | 6,092,057 | A | 7/2000 | Zimmerman et al. |
| 5,867,100 | A | 2/1999 | dHont | 6,099,043 | A | 8/2000 | Story |
| 5,870,031 | A | 2/1999 | Kaiser et al. | 6,101,174 | A | 8/2000 | Langston |
| 5,870,915 | A | 2/1999 | dHont | 6,102,162 | A | 8/2000 | Teicher |
| 5,878,215 | A | 3/1999 | Kling et al. | 6,102,672 | A | 8/2000 | Woollenweber |
| 5,878,337 | A | 3/1999 | Joao et al. | 6,105,008 | A | 8/2000 | Davis et al. |
| 5,878,403 | A | 3/1999 | DeFrancesco et al. | 6,105,013 | A | 8/2000 | Curry et al. |
| 5,880,675 | A | 3/1999 | Trautner | 6,105,865 | A | 8/2000 | Hardesty |
| 5,881,272 | A | 3/1999 | Balmer | 6,108,641 | A | 8/2000 | Kenna et al. |
| 5,883,377 | A | 3/1999 | Chapin, Jr. | 6,109,525 | A | 8/2000 | Blomqvist et al. |
| 5,887,266 | A | 3/1999 | Heinonen et al. | 6,112,152 | A | 8/2000 | Tuttle |
| 5,890,137 | A | 3/1999 | Koreeda | 6,115,360 | A | 9/2000 | Quay et al. |
| 5,898,783 | A | 4/1999 | Rohrbach | 6,116,423 | A | 9/2000 | Troxtell, Jr. et al. |
| 5,903,830 | A | 5/1999 | Joao et al. | 6,116,505 | A | 9/2000 | Withrow |
| 5,905,798 | A | 5/1999 | Nerlikar et al. | 6,118,189 | A | 9/2000 | Flaxl |
| 5,912,678 | A | 6/1999 | Saxena et al. | 6,121,544 | A | 9/2000 | Petsinger |
| 5,917,168 | A | 6/1999 | Nakamura et al. | 6,123,223 | A | 9/2000 | Watkins |
| 5,920,628 | A | 7/1999 | Indeck et al. | 6,129,274 | A | 10/2000 | Suzuki |
| 5,923,734 | A | 7/1999 | Taskett | 6,133,834 | A | 10/2000 | Eberth et al. |
| 5,923,884 | A | 7/1999 | Peyret et al. | 6,141,651 | A | 10/2000 | Riley et al. |
| 5,924,080 | A | 7/1999 | Johnson | 6,144,948 | A * | 11/2000 | Walker et al. ................. 705/38 |
| 5,929,801 | A | 7/1999 | Aslanidis et al. | 6,167,236 | A | 12/2000 | Kaiser et al. |
| 5,931,917 | A | 8/1999 | Nguyen et al. | 6,177,860 | B1 | 1/2001 | Cromer et al. |
| 5,933,624 | A | 8/1999 | Balmer | 6,179,205 | B1 | 1/2001 | Sloan |
| 5,943,624 | A | 8/1999 | Fox et al. | 6,179,206 | B1 | 1/2001 | Matsumori |
| 5,948,116 | A | 9/1999 | Aslanidis et al. | 6,188,994 | B1 | 2/2001 | Egendorf |
| 5,953,512 | A | 9/1999 | Cai et al. | 6,189,787 | B1 | 2/2001 | Dorf |
| 5,955,717 | A | 9/1999 | Vanstone | 6,192,255 | B1 | 2/2001 | Lewis et al. |
| 5,955,969 | A | 9/1999 | dHont | 6,198,728 | B1 | 3/2001 | Hulyalkar et al. |
| 5,956,024 | A | 9/1999 | Strickland et al. | 6,198,875 | B1 | 3/2001 | Edenson et al. |
| 5,963,924 | A | 10/1999 | Williams et al. | 6,202,927 | B1 | 3/2001 | Bashan et al. |
| 5,969,318 | A * | 10/1999 | Mackenthun ............... 235/380 | 6,205,151 | B1 | 3/2001 | Quay et al. |
| 5,970,148 | A | 10/1999 | Meier | 6,206,293 | B1 | 3/2001 | Gutman et al. |
| RE36,365 | E | 11/1999 | Levine et al. | 6,213,390 | B1 | 4/2001 | Oneda |
| 5,978,840 | A | 11/1999 | Nguyen et al. | 6,215,437 | B1 | 4/2001 | Schurmann et al. |
| 5,982,293 | A | 11/1999 | Everett et al. | 6,216,219 | B1 | 4/2001 | Cai et al. |
| 5,983,208 | A | 11/1999 | Haller | 6,219,439 | B1 | 4/2001 | Burger |
| 5,987,140 | A | 11/1999 | Rowney et al. | 6,220,510 | B1 | 4/2001 | Everett et al. |
| 5,987,155 | A | 11/1999 | Dunn et al. | D442,627 | S | 5/2001 | Webb et al. |
| 5,987,498 | A | 11/1999 | Athing et al. | D442,629 | S | 5/2001 | Webb et al. |
| 5,989,950 | A | 11/1999 | Wu | 6,223,984 | B1 | 5/2001 | Renner et al. |
| 5,991,608 | A | 11/1999 | Leyten | 6,224,109 | B1 | 5/2001 | Yang |
| 5,991,748 | A | 11/1999 | Taskett | 6,226,382 | B1 | 5/2001 | MRaihi et al. |
| 5,991,750 | A | 11/1999 | Watson | 6,230,270 | B1 | 5/2001 | Laczko, Sr. |
| 5,996,076 | A | 11/1999 | Rowney et al. | 6,232,917 | B1 | 5/2001 | Baumer et al. |
| 6,002,438 | A | 12/1999 | Hocevar et al. | 6,233,683 | B1 | 5/2001 | Chan et al. |
| 6,002,767 | A | 12/1999 | Kramer | 6,237,848 | B1 | 5/2001 | Everett |
| 6,003,014 | A | 12/1999 | Lee et al. | 6,239,675 | B1 | 5/2001 | Flaxl |
| 6,005,942 | A | 12/1999 | Chan et al. | 6,240,187 | B1 | 5/2001 | Lewis |
| 6,006,216 | A | 12/1999 | Griffin et al. | 6,257,486 | B1 | 7/2001 | Teicher et al. |

| | | |
|---|---|---|
| 6,259,769 B1 | 7/2001 | Page |
| 6,260,026 B1 | 7/2001 | Tomida et al. |
| 6,260,088 B1 | 7/2001 | Gove et al. |
| 6,264,106 B1 | 7/2001 | Bridgelall |
| 6,266,754 B1 | 7/2001 | Laczko, Sr. et al. |
| 6,273,335 B1 | 8/2001 | Sloan |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,293,462 B1 | 9/2001 | Gangi |
| 6,315,193 B1 | 11/2001 | Hogan |
| 6,315,195 B1 | 11/2001 | Ramachandran |
| 6,317,721 B1 | 11/2001 | Hurta et al. |
| 6,318,636 B1 | 11/2001 | Reynolds et al. |
| 6,323,566 B1 | 11/2001 | Meier |
| 6,325,285 B1 | 12/2001 | Baratelli |
| 6,325,293 B1 | 12/2001 | Moreno |
| 6,326,934 B1 | 12/2001 | Kinzie |
| 6,327,573 B1 | 12/2001 | Walker et al. |
| 6,342,844 B1 | 1/2002 | Rozin |
| 6,353,811 B1 | 3/2002 | Weissman |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,386,444 B1 | 5/2002 | Sullivan |
| 6,388,533 B2 | 5/2002 | Swoboda |
| 6,390,375 B2 | 5/2002 | Kayanakis |
| 6,400,272 B1 | 6/2002 | Holtzman et al. |
| 6,402,026 B1 | 6/2002 | Schwier |
| 6,402,028 B1 | 6/2002 | Graham, Jr. et al. |
| 6,411,611 B1 | 6/2002 | Van der Tuijn |
| 6,415,978 B1 | 7/2002 | McAllister |
| 6,422,464 B1 | 7/2002 | Terranova |
| 6,424,029 B1 | 7/2002 | Giesler |
| 6,427,910 B1 | 8/2002 | Barnes et al. |
| 6,439,455 B1 | 8/2002 | Everett et al. |
| 6,442,532 B1 | 8/2002 | Kawan |
| 6,457,996 B1 | 10/2002 | Shih |
| 6,466,804 B1 | 10/2002 | Pecen et al. |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,481,621 B1 | 11/2002 | Herrendoerfer et al. |
| 6,481,632 B2 | 11/2002 | Wentker et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,367 B1 * | 12/2002 | Zacharias .................. 235/382 |
| 6,494,380 B2 | 12/2002 | Jarosz |
| 6,505,772 B1 | 1/2003 | Mollett et al. |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,588,660 B1 | 7/2003 | Buescher et al. |
| 6,589,119 B1 | 7/2003 | Orus et al. |
| 6,608,995 B1 | 8/2003 | Kawasaki et al. |
| 6,609,655 B1 | 8/2003 | Harrell |
| 6,626,356 B2 | 9/2003 | Davenport et al. |
| 6,628,961 B1 | 9/2003 | Ho et al. |
| 6,650,887 B2 | 11/2003 | McGregor et al. |
| 6,665,405 B1 | 12/2003 | Lenstra |
| 6,674,786 B1 | 1/2004 | Nakamura et al. |
| 6,679,427 B1 | 1/2004 | Kuroiwa |
| 6,684,269 B2 | 1/2004 | Wagner |
| 6,687,714 B1 | 2/2004 | Kogen et al. |
| 6,690,930 B1 | 2/2004 | Dupre |
| 6,693,513 B2 | 2/2004 | Tuttle |
| 6,705,530 B2 | 3/2004 | Kiekhaefer |
| 6,711,262 B1 | 3/2004 | Watanen |
| 6,732,919 B2 * | 5/2004 | Macklin et al. .............. 235/380 |
| 6,732,936 B1 | 5/2004 | Kiekhaefer |
| 6,742,120 B1 | 5/2004 | Markakis et al. |
| 6,760,581 B2 | 7/2004 | Dutta |
| 6,789,012 B1 | 9/2004 | Childs et al. |
| 6,915,277 B1 * | 7/2005 | Manchester et al. .......... 705/39 |
| 2001/0013542 A1 | 8/2001 | Horowitz et al. |
| 2001/0024157 A1 | 9/2001 | Hansmann et al. |
| 2001/0034565 A1 | 10/2001 | Leatherman |
| 2001/0039617 A1 | 11/2001 | Buhrlen et al. |
| 2002/0011519 A1 | 1/2002 | Shults |
| 2002/0028704 A1 | 3/2002 | Bloomfield et al. |
| 2002/0035548 A1 | 3/2002 | Hogan et al. |
| 2002/0040936 A1 | 4/2002 | Wentker et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0029214 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0166891 A1 | 11/2002 | Stoutenburg et al. |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | DArbelott et al. |
| 2003/0014307 A1 | 1/2003 | Heng |
| 2003/0014357 A1 | 1/2003 | Chrisekos et al. |
| 2003/0014891 A1 | 1/2003 | Nelms et al. |
| 2003/0018532 A1 | 1/2003 | Dudek et al. |
| 2003/0025600 A1 | 2/2003 | Blanchard |
| 2003/0046228 A1 | 3/2003 | Berney |
| 2003/0057226 A1 | 3/2003 | Long |
| 2003/0057278 A1 | 3/2003 | Wong |
| 2003/0069828 A1 | 4/2003 | Blazey et al. |
| 2003/0069846 A1 | 4/2003 | Marcon |
| 2003/0112972 A1 | 6/2003 | Hattick et al. |
| 2003/0120554 A1 | 6/2003 | Hogan et al. |
| 2003/0121969 A1 | 7/2003 | Wankmueller |

| | | | |
|---|---|---|---|
| 2003/0132284 A1 | 7/2003 | Reynolds et al. |
| 2003/0140228 A1 | 7/2003 | Binder |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0233334 A1 | 12/2003 | Smith |
| 2004/0010462 A1 | 1/2004 | Moon et al. |
| 2004/0015451 A1 | 1/2004 | Sahota et al. |
| 2004/0029569 A1 | 2/2004 | Khan et al. |
| 2004/0039860 A1 | 2/2004 | Mills et al. |
| 2004/0139021 A1 | 7/2004 | Reed et al. |
| 2005/0004921 A1 | 1/2005 | Beenau et al. |
| 2005/0035847 A1 | 2/2005 | Bonalle et al. |

FOREIGN PATENT DOCUMENTS

| | | |
|---|---|---|
| DE | 29702538 U1 | 4/1997 |
| EP | 0 358 525 A2 | 3/1990 |
| EP | 0424 726 A1 | 10/1990 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 199 684 A2 | 4/2002 |
| EP | 1 251 450 A1 | 10/2002 |
| GB | 2347537 | 9/2000 |
| JP | 08-244385 | 9/1996 |
| JP | 08/324163 | 12/1996 |
| JP | 2000-11109 A | 1/2000 |
| JP | 2000-40181 A | 2/2000 |
| JP | 2000-67312 A | 3/2000 |
| JP | 2000-207641 A | 7/2000 |
| JP | 2001-5931 A | 1/2001 |
| JP | 2001-283122 A | 10/2001 |
| WO | WO 95/32919 | 12/1995 |
| WO | WO 99/03057 A1 | 1/1999 |
| WO | WO 99/27492 | 6/1999 |
| WO | WO 00/10144 A1 | 2/2000 |
| WO | WO 00/38088 A1 | 6/2000 |
| WO | WO 01/04825 A1 | 1/2001 |
| WO | WO 01/15098 A1 | 3/2001 |
| WO | WO 01/43095 A2 | 6/2001 |
| WO | WO 01/55955 A1 | 8/2001 |
| WO | WO 01/72224 A1 | 10/2001 |
| WO | WO 01/77856 A1 | 10/2001 |
| WO | WO 01/80473 A2 | 10/2001 |
| WO | WO 01/86535 A1 | 11/2001 |
| WO | WO 01/90962 A1 | 11/2001 |
| WO | WO 01/95243 A1 | 12/2001 |
| WO | WO 02/01485 A1 | 1/2002 |
| WO | WO 02/13134 A2 | 2/2002 |
| WO | WO 02/063545 A2 | 8/2002 |
| WO | WO 02/065246 A2 | 8/2002 |
| WO | WO 02/065404 A2 | 8/2002 |
| WO | WO 02/069221 A1 | 9/2002 |
| WO | WO 02/073512 A1 | 9/2002 |
| WO | WO 02/086665 A2 | 10/2002 |
| WO | WO 02/091281 A2 | 11/2002 |
| WO | WO 02/097575 A2 | 12/2002 |
| WO | WO 02/101670 A2 | 12/2002 |
| WO | WO 03/007623 A1 | 1/2003 |

OTHER PUBLICATIONS

"Physical Reality: A Second Look", Ken Sharp, Senior Technical Editor, http://www.idsystems.com/reader/1999_03/phys0399_pt2/phys0399_pt2.htm.

"'Magic Wands' to Speed Mobile Sales", BobBrewin, Jan. 15, 2001, http://www.computerworld.com/mobiletopics/mobile/story/1,10801,563300.html.

"Mobile Speedpass Goes Global as Mobil Singapore Rolls Out Asia's First RFID-Based-Pay-At-The-Pump System", Press Release, Apr. 5, 1999, http://www.ti.com/tiris/docs/news_releases/rel12.htm.

"Speedpass Unleashed", Jun. 4, 2002 http://www.cardweb.com/cardtrak/news/cf2_20a_97.html.

Prophecy Central Update #9, Oct. 10, 1997, http://www.bible-prophecy.com/pcu9.htm.

International Newsletter of the TI RFID Group, Issue 20, 2000.

"CES: Microsoft's SPOT Technology has Humble Origins", by James Niccolai, Jan. 10, 2003, http://archive.inforworld.com/articles/hn/xml/03/01/10/030110hnspot.xml?s=1DGNS.

"Microsoft: See SPOT Run On Your Wrist", by Richard Shim, Jun. 5, 2003, http://news.com.com/2100-1041_3-1013442.html?tag=fd_top.

"Networking: Microsoft SPOT", by Jeremy A. Kaplan, Jul. 1, 2003, http://www.pcmag.com/print_article/0,3048.a=43561,00.asp.

"Microsoft Launches Smart Personal Object Technology Initiative", Press Release from COMDEX Fall 2002, Nov. 17, 2002, http://www.Microsoft.com/presspass/features/2002/nov02/11-17SPOT.asp.

"Bank Extends RFID Payment Pilot: Bank of America will continue to test its QuickWave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

Vendors Target Amusement Parks: Protecting children and enabling cashless payments make RFID an appealing option for the entertainment Industry, RFID Journal, Nov. 27, 2002.

"Inside's Next-Gen Smart Card: The French company plans to Introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has released of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embraces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 IC S50, Philips Semiconductors, Product Specification Rev. 5.1 May 2001.

http://www.semiconductors.philips.com/news/content/file_878.html, Apr. 7, 2003.
http://www.palowireless.com/Iinfotooth/whatis.asp, Apr. 28, 2003.
http://www.palowireless.com/infotooth/tutorial.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.palowireless.com/infotooth/tutoria1/baseband.asp, Apr. 28, 2003.
http://www.palowireless.com/infotooth/tutorial/imp.asp, Apr. 28, 2003.
http://www.palowireless.com/infotooth/tutorial/hci.asp, Apr. 28, 2003.
http://www.palowireless.com/infotooth/tutorial/12cap.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/tutorial/k1_gap.asp, Apr. 28, 2003.
"Sony, Philips to Test RFID Platform", RFID Journal, May 8, 2003.
Costco, The Choice is Yours, 1998, http://www.costco.com/framset.asp?trg=subcat%2Easp&catid=502&subsid=503&log=.
For Partners, Card Co-branding, 2000, http://www.statravel.com.sg/idcards/pcobrand.
USBanker, Article 5, 1995, http://www.banking.com/us-banker/art5.

* cited by examiner

PUBLIC/PRIVATE DUAL CARD SYSTEM AND METHOD

CROSS REFERENCE TO RELATED APPLICATIONS

This application is a continuation-in-part of, and claims priority to, U.S. patent application Ser. No. 09/764,688, filed on Jan. 16, 2001, by Inventors Fitzmaurice et al., and entitled "MULTIPLE-SERVICE CARD SYSTEM", now U.S. Pat. No. 6,742,704, which itself claims priority to U.S. Provisional Patent Application No. 60/177,530, filed Jan. 21, 2000; and U.S. patent application Ser. No. 10/708,585, filed on Mar. 12, 2004, by inventors Beenau et al., and entitled "SYSTEMS AND METHODS FOR MANAGING MULITPLE ACCOUNTS ON A RF TRANACTION INSTRUMENT", which itself claims priority to U.S. patent application Ser. No. 10/608,792, entitled "METHOD AND APPARUTUS FOR ENROLLING WITH MULTIPLE TRANSACTION ENVIRONMENTS," filed Jun. 27, 2003, and U.S. patent application Ser. No. 10/435,420, entitled "SYSTEM AND METHOD FOR MANAGING ACCOUNT INFORMATION LIFE CYCLES," filed May 9, 2003, all of which are hereby incorporated by reference.

FIELD OF INVENTION

The present invention generally relates to private retail transaction card and open transaction card services and, more particularly, to a system and method for providing a single card that functions as both a private retail transaction card and open transaction card and a system and method for facilitating the management of multiple data sets on various card and "non-card" transaction enabling instruments.

BACKGROUND OF INVENTION

In today's world, there is a wide variety of benefits that are available to a consumer where access to the benefits depends upon the consumer's possession of a card. For example, some of the benefits, to which a typical consumer may gain access by possessing a card, include proof of identity, proof of professional licensing, entry to an exclusive membership club, entry to an access-restricted location, access to credit services, telephone system use, and accrual of loyalty rewards/incentives such as frequent flier miles or grocery store discounts and rebates. For example, U.S. Pat. No. 5,924,080, which is hereby incorporated by reference, discloses a system that may enable a consumer to receive discounts without the burden of using coupons, similar to the system currently used by many grocery stores.

Due to the desirability of such benefits, consumers in today's world typically carry a wide array of cards in their wallets and purses. The cards consumers now carry include, among others, credit cards, driver's licenses, club membership cards, frequent flier cards, professional registration cards, retailer loyalty cards, and security-related restricted-access cards. Typically, each of these consumer cards contains information about the specific user or consumer, information about the service or benefit provider and information serving to define the benefits or services, to which the consumer is entitled by virtue of his or her possession of the card. The information concerning the card member may include photographs, signatures, fingerprints, and other information that identifies or describes the card member. Information regarding the identity of the service provider and the associated benefits, to which the card member is entitled, may be readily ascertained by reading the face of the card, may be encoded or accessed by using the card. Information may be incorporated onto the cards through a variety of means including imprinting, punching, laminating, embossing, bar encoding, magnetic stripe encoding, and even affixation or incorporation of micro-chips. For example, U.S. Pat. No. 4,998,753, which is hereby incorporated by reference, discloses a driver's license formed as a plastic card.

Unfortunately, due to the proliferation of services and benefits currently available from diverse service providers, the quantity of cards that average consumers carry has become unreasonably and unnecessarily burdensome. For example, on a single shopping trip, a typical consumer may carry a drivers license to drive their motor vehicle to the merchant's location, a membership card to obtain access to the merchant's exclusive membership club, a calling card to make phone calls during the shopping trip, and a credit card to obtain credit services to facilitate the purchase of goods from the merchant. Yet, it can be cumbersome and uncomfortable to carry all these necessary cards in one's wallet, pocket or purse.

Thus, it would be advantageous to decrease the volume of cards that a consumer must carry while retaining the consumer's access to the full array of benefits provided by the diversity of service providers. U.S. Pat. No. 5,590,038, which is hereby incorporated by reference, discloses a universal electronic transaction card that may serve as a credit card, identification card, and medical card. Further, U.S. Pat. No. 5,844,230, which is also hereby incorporated by reference, discloses a card that may contain the information of two credit cards on a single card. While these references attempt to decrease the volume of cards a consumer must carry to access a given set of services, they require, among other elements, multiple sets of embossed information and multiple magnetic stripes.

Simultaneous with this desire to reduce the volume of cards, there is an evident need to increase the information carrying capacity of such consumer cards. For example, U.S. Pat. No. 5,308,121 and a related patent, U.S. Pat. No. 5,503,434, both of which are hereby incorporated by reference, disclose credit cards that can be unfolded to allow more room for the printing of information. Furthermore, U.S. Pat. No. 4,066,873, which is also hereby incorporated by reference, discloses a banking identification and access card that contains a magnetic stripe and a bar code on the back of the card that can be scanned by a scanning apparatus.

Yet, despite these varied efforts at increasing the utility of consumer cards while decreasing the volume of cards a consumer must carry, no card currently exists that offers the combined benefits of multiple cards without necessitating the incorporation of additional embossed information or magnetic stripes on the associated card. Furthermore, the prior art attempts at reducing the quantity of cards a consumer must carry are typically aimed at modifying the cards, rather than modifying the processes and systems employed by the individual benefit providers, such that the consumer may continue to enjoy benefit from multiple providers. In fact, none of the methods or systems for providing a multiplicity of services through a single card that are known in the art involve substantial administrative cooperation between distinct service providers.

Furthermore, it has become apparent that consumers who seek access to a particular set of benefits from one service provider are more likely to desire access to a second set of benefits from a distinct class of service providers. For example, it stands to reason that consumers who access a membership shopping club are likely to desire credit services during their trip to the club. Therefore, it would be advantageous for providers of distinct services such as credit services and membership club shopping services to cooperate to offer a single card that provides consumers with access to the benefits of the currently separate and distinct cards. By doing so, a primary party provider of credit services and a partnering membership club can encourage use of their respective services while providing a synergistic administrative benefit to themselves and their consumers.

Moreover, the separate cards currently carried by a typical consumer contain a multiplicity of duplicate information such as pictures, signatures, addresses, billing information, etc. Therefore, it would be advantageous to minimize duplication of identical information on multiple cards. It would further be advantageous for the information to be grouped on the different sides of a single card such that a first side of the card provides a first set of benefits while the other side of the card provides access to a separate and distinct set of benefits. Thus, it would be advantageous to have a multiple-service card that functions to provide a consumer with the benefits typically provided by distinct service providers. It would further be advantageous if the multiple-service card did not require multiple card-like elements connected by a hinge or the use of multiple magnetic stripes. It would further be advantageous to have a system and method to facilitate cooperation between separate and distinct providers of card services.

Further, it would be advantageous to have a multiple-service card that functions as both a credit card as well as a separate entity's membership card. It would also be advantageous for the multiple-service card to feature the customer's picture on the card's back side, rather than on its front side. It would also be advantageous to have the picture that is to be placed on the back of the card captured by the service partner and passed to the card generator. It would also be advantageous to have a card that contains a bar code that may be scanned at the point of sale when customers make purchases so that the scanned data may be forwarded directly to the service partner's systems for reporting and tracking purposes.

Some financial transaction instruments, such as credit cards and loyalty program cards, are capable of accessing information related to multiple accounts. For example, a credit card may be able to access membership data associated with both a credit card account and a wholesale purchase club account. These financial transaction instruments may generally include one or more applications for selecting and then securely utilizing a sub-set of specified account information. However, the systems associated with these cards typically delegate the loading of these applications and management of the related data sets to third parties on behalf of both the issuer of the instrument and "application tenants" residing on the issuer's financial transaction instruments. Managing data associated with a credit card via the issuer/third party may involve time consuming steps such as requesting permission to manage data, conforming to data standard formats, and implementing changes. Thus, traditional solutions for managing multiple application tenants are disadvantageous in that the traditional solutions leave a disproportional burden on the issuer and/or the delegated third party in terms of managing accounts on a financial transaction instrument.

Another disadvantage is that, in general, the financial transaction instruments, which are capable of accessing information related to multiple accounts, are typically designed to access only those multiple accounts managed by the same issuer. For example, the same issuer provides both the credit card and the wholesale purchase club account to the user. As such, the issuer providing both accounts generally establishes its own application tenant storage format and management protocol related to the accounts. The established format and protocol is ordinarily different from any format or protocol used by other unrelated issuers, which provides the issuer increased control over access to the account data. Because of the differing unique protocols/formats amongst issuers, multiple issuers typically provide a transaction instrument corresponding to an account offered by the issuer, where the data for accessing the account is stored in that issuer's protocol/format. Thus, a user wishing to access multiple accounts managed by different issuers, must ordinarily carry at least one transaction instrument per issuer. Carrying multiple transaction instruments can be inconvenient in that the instruments may be more easily misplaced, lost or stolen, preventing the user from accessing the account.

Another disadvantage of the above conventional methods of managing multiple accounts, which is related to the different issuer formats/protocols, is that, since conventional financial transaction instruments typically only store application tenant information related to one issuer, the information may not be recognized by a second issuer distinct from the first. That is, the user of the financial transaction instrument typically is only able to use the financial transaction instrument at locations identified by the issuer of the transaction card. The financial transaction instrument may not be used at any other locations, since the locations not identified by the user will not recognize the application tenant information which is typically stored on the instrument in a issuer determined format. As such, in order to access multiple accounts managed by different issuers using different formats/protocols, the user must typically carry multiple cards, as noted above.

In addition to the above, the conventional multiple account management systems have another disadvantage in that data contained on the financial transaction instruments may not be easily updated. That is, traditional financial transaction instruments are only "readable" instruments, and not "writeable" instruments, where the data on the instrument may be read from the instrument but not written to the instrument. More particularly, once the financial instrument is issued to the user, the data often may not be modified. Instead, where information contained on the instrument is to be modified, a new physical consumer device (e.g. transaction instrument) often needs to be issued. That is, the information stored on the financial transaction instruments are typically not permitted to be changed without issuer involvement. The issuer may be involved, for example, by verifying compatibility of a proposed new or updated information, checking conformance of the data to the issuer's standard formatting and size guidelines, and implementing the changes. Thus, additional burdens are placed on the issuer where it is necessary to add unique data sets to a financial transaction instrument, or to update the data stored thereon.

As such, the ability to store data on a single financial transaction instrument thereby permitting a user of the single instrument to complete transactions using multiple transaction accounts issued by different distinct issuers, does not exist. A need exists for a single financial transaction instrument which stores multiple independent data sets provided by multiple distinct issuers irrespective of the format/protocol of the various issuers. A need further exists for a single financial transaction instrument which may be used to efficiently manage the data sets and applications stored on the instrument, irrespective of the protocol used by an issuer to process the data. Even more particularly, a need exists for a system for managing multiple transaction accounts of differing formats on a single financial transaction instrument which is issued to a user, and which permits the user to access different accounts provided by multiple distinct financial account issuers.

SUMMARY OF INVENTION

The present invention provides a system and method for providing consumers with the benefits of multiple cards while allowing consumers to carry a single card. To accomplish this advantage, the system and method of the present invention enables a single card to function in multiple modes, for example, as both a private retail transaction card managed by a service partner and an open transaction card. By providing a system of back-end functionality that takes advantage of cooperation between the multiple service providers, the present invention reduces the disadvantages of the prior art systems such as, for example, the requirement to join, through use of a hinge and a fastener, multiple card segments or the requirement to embed multiple magnetic stripes into the consumer's card.

More particularly, the system of the present invention provides methods for opening new accounts, methods for accomplishing card replacement, methods for canceling a service partner membership, methods for canceling a primary party account, and methods for transferring an account to a different service partner account. The multiple-service card enabled by the present invention may include any combination of membership information, a barcode, and a photo in addition to standard credit card information.

In one exemplary embodiment of the present invention, a system and method is provided for facilitating the management of distinct data sets of different formats on a RF operable transaction instrument. The system includes a RF financial transaction instrument for use in managing multiple distinct data sets provided by distinct issuers. The method includes the steps of: receiving, from a read/write device, at least a first data of a first format at the financial transaction instrument, wherein the first data set is owned by a first owner; receiving, from the read/write device, at least a second data set of a second format at the financial transaction instrument, wherein the second data set is owned by a second owner, and wherein the first format is different from the second format; storing the first data set and the second data set on the financial transaction instrument, in distinct fashion and in accordance with the first and second format respectively, where the first data set and the second data set are unique one from the other; and modifying (e.g., adding, deleting, overwriting, altering) at least the first data set, and/or adding a third data set, in accordance with instructions provided by the data set owner or user.

In another example, a financial transaction instrument comprises a data set management system for facilitating the management of more than one data set stored on the transaction instrument, the RF financial transaction instrument comprising at least one data storage area configured to store a first data set of a first format and a second data set of a second format different from the first format. The first data set is associated with a first data set owner (e.g., first issuer) and the first data set is configured to be stored on the financial transaction instrument independent of a second data set owner (e.g., second issuer); and, the second data set is associated with the second owner and the second data set is configured to be stored on the financial transaction instrument independent of the first data set owner, wherein the first data set and the second data set are stored in accordance with the first and second format, respectively.

In yet another exemplary embodiment of the present invention, a data management system comprises: a RF financial transaction instrument associated with a first data set of a first format and a second data set of a second format, wherein the financial transaction instrument is configured to facilitate management of the first data set without involvement of the first data set owner. The data management system may further comprise a read/write device configured to communicate with the financial transaction instrument for providing the first and second data sets to the instrument and for modifying the data sets thereon in accordance with a condition header annotated to the data sets. The read/write device may be stand alone, or the device may be connected to a transaction processing network. The read/write device may be used to load the issuer-owned data onto the transaction instrument, and thereafter delete, augment and/or manage the information stored thereon, or to add additional distinct data sets.

As noted, exemplary embodiments of the financial transaction instrument of the present invention may include storing a first and second data set of differing formats on a transaction instrument database. Alternate exemplary embodiments of the present invention may also include a "mirror image" of the first and second data set stored on a remote database removed from the transaction instrument issuer and the transaction instrument itself. The remote database may be placed in communication with the transaction instrument issuer system, and the financial transaction instrument via, for example, electronic communication with a network. As such, in one exemplary aspect, the present invention permits changes which are made on the remote database (or transaction instrument) to be mimicked or synchronized on the instrument (or remote database).

In still another exemplary embodiment, the invention secures authorization from an issuer prior to loading the issuer-owned data onto the RF transaction instrument. Once authorization is given, the issuer may be "enrolled" in a transaction instrument multiple account management system, the associated issuer-owned data may then be loaded on the transaction instrument. The issuer-owned data may be loaded in a format recognizable by a merchant system or by a system maintained by issuer. Thus, when the transaction instrument is presented to complete a transaction, the data may be transferred to the issuer in an issuer recognized format, eliminating the need to carry multiple transaction instruments for each issuer. That is, the issuer receives the data in an issuer recognized format and may process the accompanying transaction under issuer's already established business as usual protocols. In this way, the issuer is permitted to manage its issuer provided program at the issuer location, irrespective of the management of other programs provided by other distinct issuers enrolled in the multiple account management system.

BRIEF DESCRIPTION OF DRAWINGS

Additional aspects of the present invention will become evident upon reviewing the none-limiting embodiments described in the specification and the claims taken in conjunction with the accompanying figures, wherein like numerals designate like elements, and:

DETAILED DESCRIPTION

Figure 1:
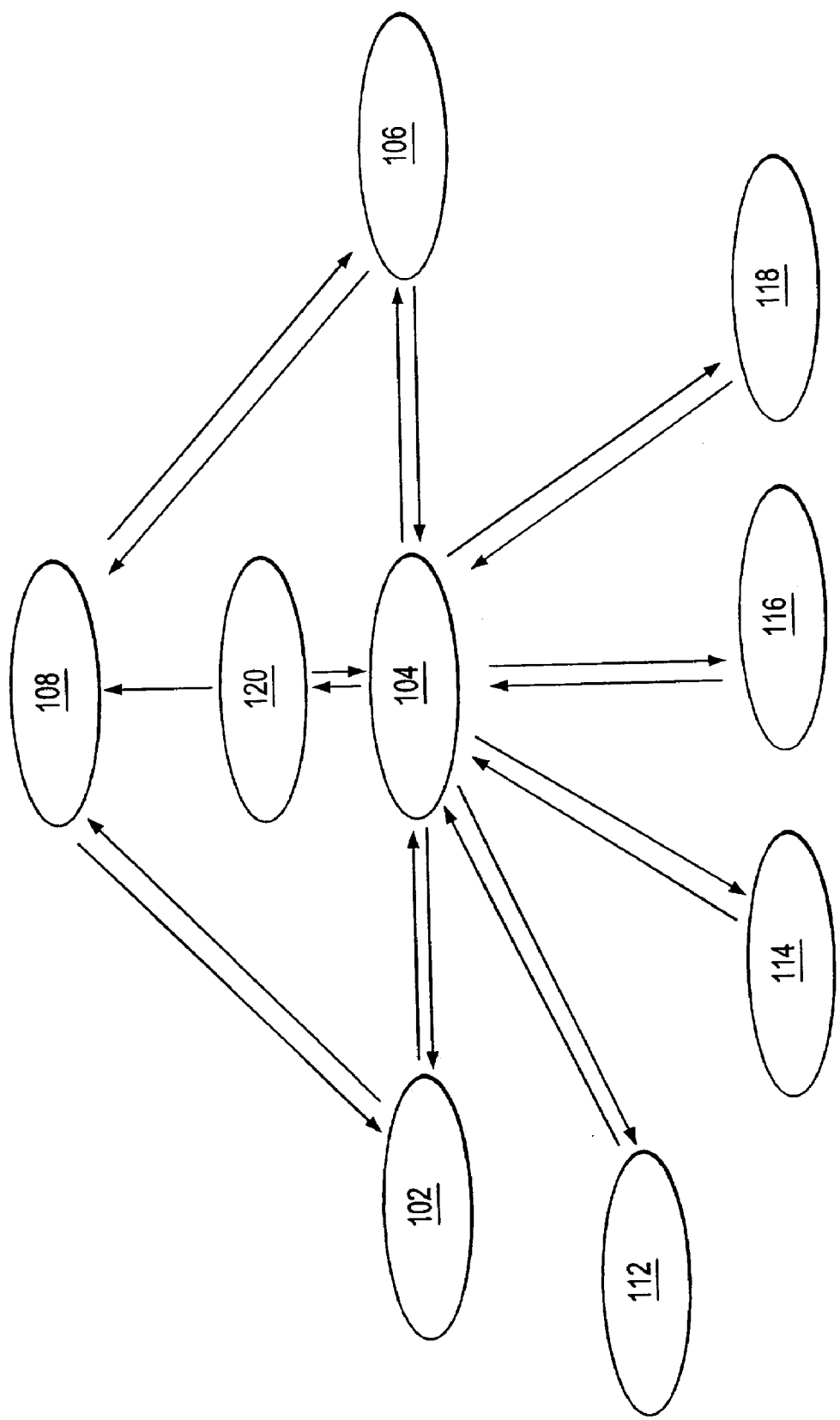
FIG. 1 is a schematic diagram of an exemplary system for providing a multiple-service card.

The present invention may be described herein in terms of functional block components, screen shots, optional selections, and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction to cryptography, please review a text written by Bruce Schneider, which text is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system. It should further be noted that the order of the steps denoted in the attached drawings are not intended as limitations and the steps may be accomplished in other orders without deviating from the scope of the present invention. Still further, the actors denoted as performing individual steps in the disclosed process should not be interpreted as limiting in any way as one with ordinary skill in the art appreciates that the steps may be performed by actors different from those disclosed herein without deviating from the spirit and scope of the present invention.

It will be appreciated that many applications of the present invention could be formulated. One skilled in the art will appreciate that the network may include any system for exchanging data or transacting business, such as the Internet, an intranet, an extranet, WAN, LAN, satellite communications, and/or the like. The parties may interact with the system via any input device such as a keyboard, mouse, kiosk, personal digital assistant, handheld computer (e.g., Palm Pilot®), cellular phone, and/or the like. Similarly, the invention could be used in conjunction with any type of personal computer, network computer, workstation, minicomputer, mainframe, or the like running any operating system such as any version of Windows, Windows NT, Windows 2000, Windows 98, Windows 95, MacOS, OS/2, BeOS, Linux, UNIX, or the like. Moreover, although the invention may be implemented with TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

The consumer, merchant, primary party, and service partner may represent individual people, entities, or businesses. Although labeled as a "primary party," the primary party may represent other types of transaction instrument issuing institutions, such as credit card companies, card sponsoring companies, loyalty/incentive companies or third party issuers under contract with financial institutions. The primary party, in one embodiment, may be the first data set owner as discussed herein. The primary party may also provide an open transaction instrument which may be utilized in a payment network. The payment network which may be part of certain transactions represents existing proprietary networks that presently accommodate transactions for credit cards, debit cards, and other types of financial/banking cards. The payment networks may include or be operated by, for example, American Express®, VisaNet® and the Veriphone® networks. The payment network may still be considered a "closed" network in that is assumed to be secure from eavesdroppers, but the transaction instruments shall still be referred to herein as "open" transaction instruments to differentiate the instruments from the "private retail" or "closed" transaction instrument. The open transaction instrument, as used herein, may include any transaction instrument or card (or other transaction account or device discussed herein) which may be used at different merchants. It is further noted that other participants may be involved in some phases of the system and methods, but these participants are not shown.

The service partner may include a private retailer which may issue its own private retail or closed transaction instrument which may only be accepted at the particular retailer, the retailer's affiliates and/or a subset of retailers. The private retail transaction instrument may be used on the open payment networks discussed above or on a private payment network. The private retail transaction instrument may include, for example, the Macy's® charge card, Sears® charge card, etc. The private retailer may be the second data set owner as described herein.

As illustrated in FIG. 1, in an exemplary embodiment, the system of the instant invention may comprise a primary party 102 provider of credit services as well as a service partner 106. Both the primary party 102 and the service partner 106 are equipped with a computing unit or system to facilitate online commerce transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, network sets of computers, and/or the like.

The primary party 102 and the service partner 106 both comprise computing units or systems, which communicate with and through a card service engine 104, and all of which are connected with each other via a data communication network. The network may be a public network, which should be assumed to be insecure and open to eavesdroppers. For example, the internet may be employed as the network. In this context, the computers may or may not be connected to the Internet at all times. For instance, the service partner 106 computer may employ a modem to occasionally connect to the Internet, whereas the primary party's computing center might maintain a permanent connection to the Internet. It is noted that the network may also be implemented as other types of networks, such as an interactive television (ITV) network. The computers may also be interconnected via existing proprietary networks such as those that presently accommodate transactions for credit cards, debit cards, and other types of financial/banking cards. Such an interconnection is a closed network that may be assumed to be secure from eavesdroppers. Examples of these proprietary networks include the American Express®, VisaNet®, and the Veriphone® networks.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described below with reference to block diagrams and flowchart illustrations of methods, apparatus (e.g., systems,) and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions, which execute on the computer or other programmable data processing apparatus, create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means, which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems, which perform the specified functions or steps, or suitable combinations of special purpose hardware and computer instructions.

Further, as one skilled in the art will appreciate, a "consumer card" or "credit card", as used herein, includes any device, code, or suitable financial instrument. The device, code or instrument may also represent an account with a financial institution, such as a bank, a card issuer, and/or the like. The device, code, or other suitable financial instrument may also have a credit line or balance associated with it, wherein the credit line or balance is in a form of a financial tender having discrete units, such as currency. Moreover, a "consumer card" or "credit card", as used herein, includes any device, code, or financial instrument suitably configured to allow the cardholder to interact or communicate with the system, such as, for example, a charge card, credit card, debit card, prepaid card, telephone card, smart card, magnetic stripe card, bar code card, authorization/access code, personal identification number (PIN), Internet code, other identification code, and/or the like. Additionally, a "cardholder" or "card member" includes any person or entity that uses a consumer card and participates in the present system and may include a person who is simply in possession of a financial account identifier, such as an authorization or account code.

Communication between the parties to the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

In general, in an exemplary embodiment, the multiple-service card is a credit card co-branded with a service partner membership card. A prospective card member 108 provides the service partner 106 with application information for both the primary party's services and a service partner's services. Such information may include, for example, traditional credit card application information as well as traditional membership club application information. The service partner 106 collects and processes the application information, and forwards it to the primary party 102, via the card service engine 104, for further processing. The card service engine 104 approves or declines the new account, and returns the information to the service partner 106. The service partner 106, then, matches the approved accounts with the membership applications it has previously processed. Finally, the service partner 106 sends its membership information to a card generator 120, which fabricates the physical card and sends the card to the card member 108. An example of the card fabrication process is found in U.S. patent application Ser. No. 09/653,837, entitled "Transaction Card", filed Sep. 1, 2000, the entire contents of which are herein incorporated by reference.

As a result, a card member 108 may be provided with a single card that serves as both a credit card and a club membership card for access to the service partner's pen or exclusive club. This multiple-service card may have the traditional credit card data on one side of the card, including, for example, the account number, name of the account holder, and the expiration date. The other side of the card may include a magnetic stripe that contains the account information in machine readable form, a space for a signature, a customer service number, a service partner membership number that is suitable to permit entry into a service partner's facility, a barcode with the same membership information and that may be scanned at the point of sale, and a photograph or a digital image or another identifying image of the card holder. The photograph or other identifying image may be taken at the service partner's location. Any combinations of the foregoing data may be located on either side of the card.

In the system of the instant invention, the primary party 102 and the service partner 106 participants cooperate to complete the processes associated with the provision of the combined card services. Those processes may include a new account process, card replacement and renewal processes, a service partner membership cancellation process, and a process for cancellation and/or transfer by a primary party 102. The card replacement and renewal process may be initiated by the primary party 102 or the service partner 106 and may be a response to a member's request, a member's reporting of fraudulent activity, an emergency, or the member's activity in association with a service partner 106. Each of the process participants performs a series of process steps.

As used herein, the term product control number refers to a number that identifies the service partner 106 that keyed in the application and the date on which it was keyed. Also, as used herein, the term balancing report refers to a report that verifies and files information sent between two parties. Finally, the information administrator 112 records information, transfers files, and send reports and other electronic communication between the primary party 102 and a service partner 106.

Figure 2A:
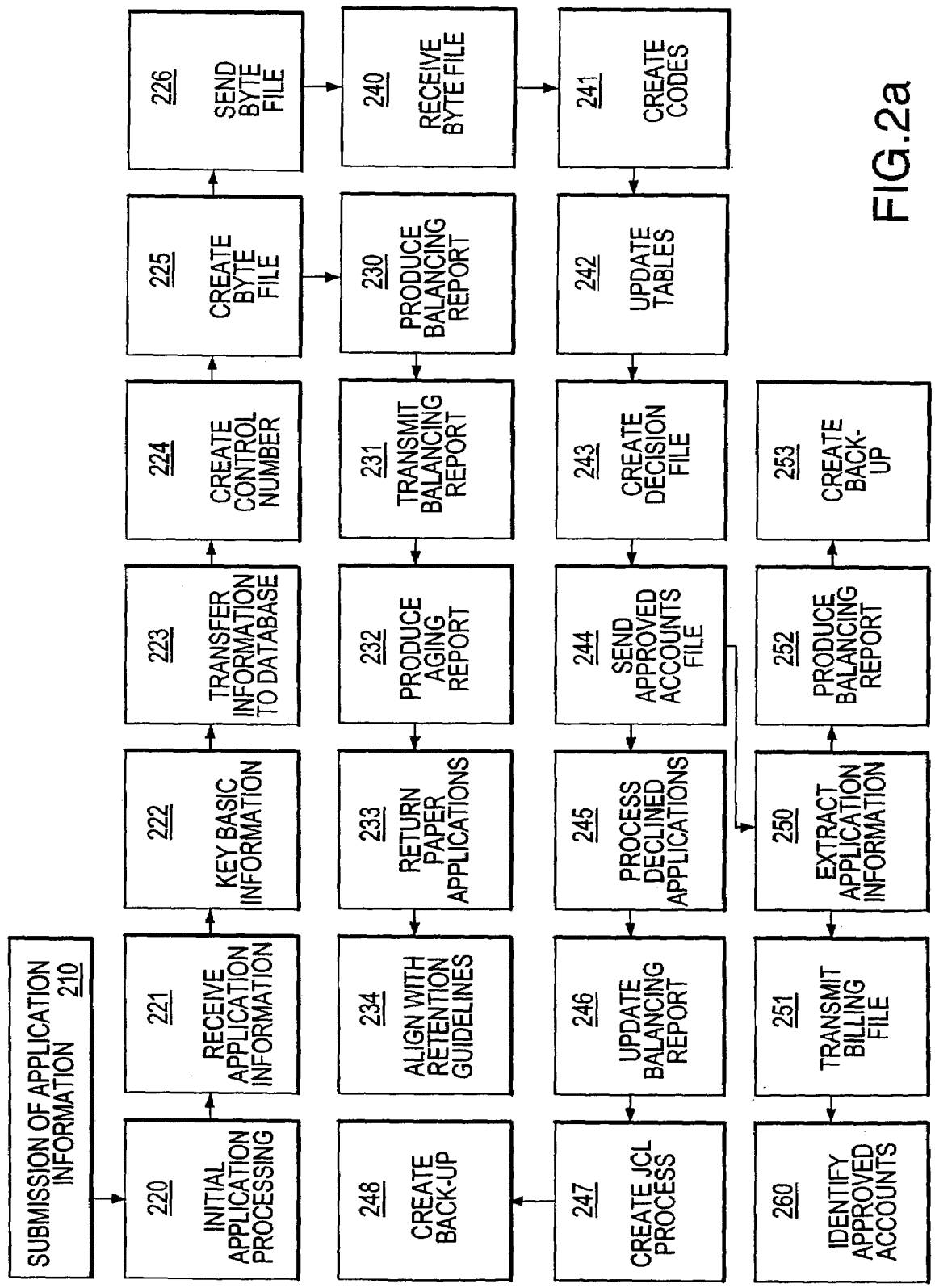
FIG. 2a is a flowchart of a portion of an exemplary new account process, complementing FIG. 2b, in accordance with the present invention.
Figure 2B:
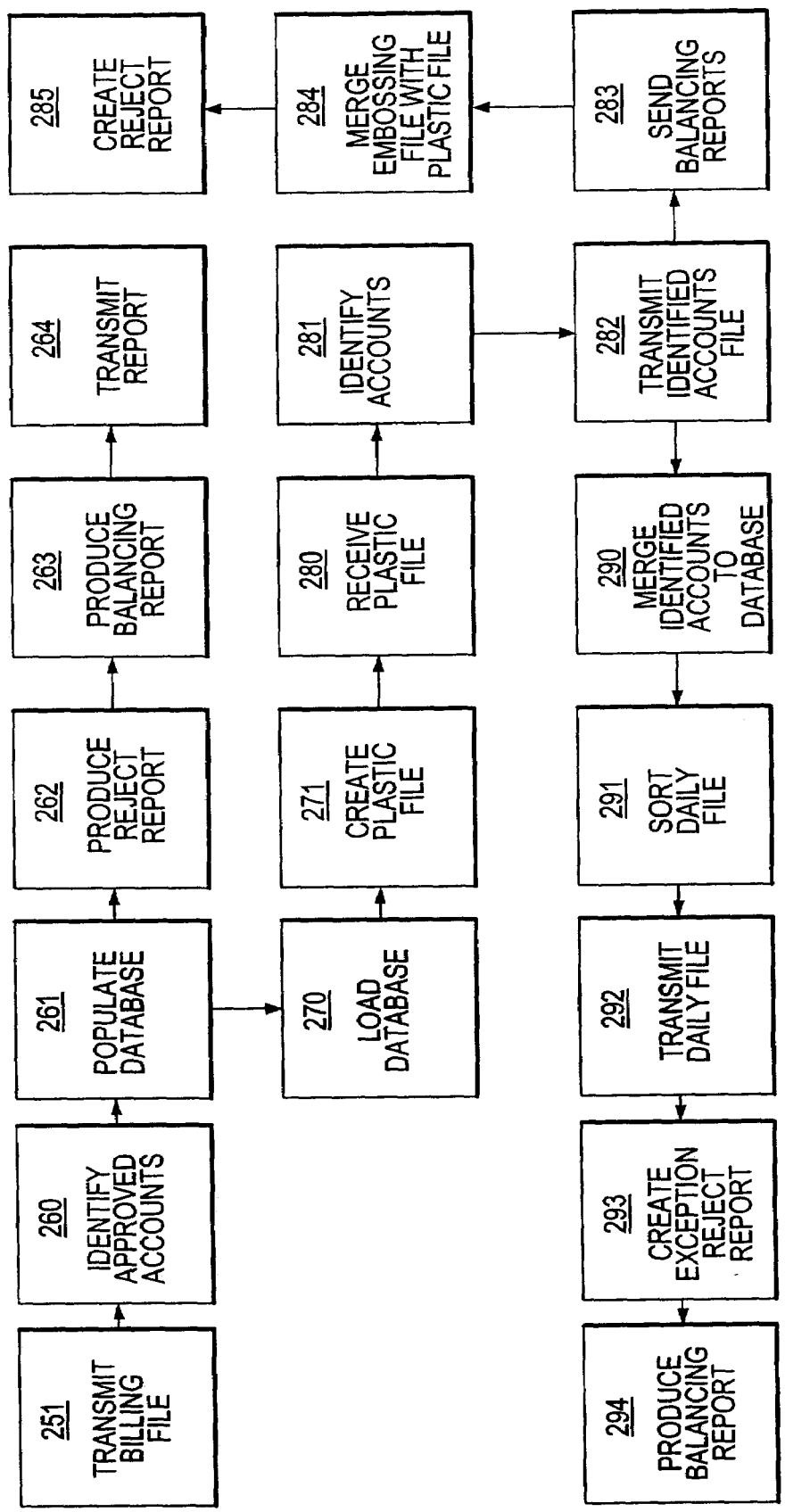
FIG. 2b is a flowchart of a portion of an exemplary new account process, complementing FIG. 2a, in accordance with the present invention.

In The New Account Process. In an exemplary new account process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Referring to FIGS. 2a and 2b, regardless whether, or to which entities, the various process steps are delegated, the new account process is initiated by a card member's submission of application information (step 210) to either the service partner 106 or the primary party 102. If the card member 108 submits the information to the service partner 106, the service partner 106 performs the initial processing of the application information (step 220). If the card member 108 submits the application information to the card service engine 104, however, the primary party 102 receives the application (step 210) from the card member 108 and routs (step 210) the information to the service partner 106, which performs the initial processing (step 220).

The initial processing (step 220) performed by the service partner 106 includes the steps of receiving (step 221) the application information, keying (step 222) each application information file for basic information, transferring (step 223) the application information into the service partner's database, creating (step 224) a unique application information file product control number for each application, creating (step 225) a standard variable byte file of new application data, and sending (step 226) the standard variable byte file of new application data via batch process interface/T1 line to the card service engine 104. The unique product control number is also applied to any physical application, which is also sent to retention. In an exemplary embodiment, this file does not contain any service partner 106 member data.

In addition to accomplishing the initial processing of new application information, the service partner 106 produces (step 230) a balancing report containing the total records of each file and transmits (step 231) the report to the primary party 102. The service partner 106 also produces (step 232) a new account aging report of any applications greater than a predetermined period of time, for example, 30 days. These reports are utilized by the information administrator 112 after each transmission. Finally, the service partner 106 returns (step 233) any paper applications and aligns (step 234) with the card service engine's retention guidelines.

Once the initial processing is complete, the card service engine 104 receives (step 240) the standard variable byte file from the service partner 106 and performs additional processing. This additional processing includes creating (step 241) necessary codes and updating (step 242) related tables required to identify the new consumer and the service partner 106 products, creating (step 243) a consolidated decisioning file, sending (step 244) an approved accounts file to the card service engine 104, processing (step 245) declined applications, updating (step 246) the balancing report containing total records of the transmitted file, creating (step 247) a job control language process to execute the information administrator balancing job, and creating (step 248) a back-up of the transmitted file and balancing reports in accordance with the card service engine's current standards. The consolidated decisioning file contains approved, declined, and cancelled service partner application information.

The customer service administrator 114 extracts (step 250) all approved, declined, and cancelled service partner application information from the card service engine's consolidated decisioning file and transmits (step 251) a billing data file that is sorted, first by product control number and then by sequence number, to the service partner 106 containing data on approved, declined, and cancelled service partner accounts, excluding pending applications. The customer service administrator 114 also produces (step 252) a balancing report containing total records of the transmitted file and creates a job control language process to execute the information administrator balancing job after receiving the service partner's transmission report. Finally, the customer service administrator 114 creates (step 253) a back-up of the transmitted file and balancing report with an expiration of 90 days.

With all declined or cancelled applications, the billing data file contains the transaction date, the product control number, the card member's name, the sequence number, and the status code indicating whether the status is approved, declined, or cancelled. With all approved applications, the billing data file contains the transaction date, the primary party's account number (basic and supplemental), the product control number, the card member's name, the sequence number, and the status code indicating whether the status is approved, declined, or cancelled.

Once the service partner 106 receives the billing data file that was transmitted by the customer service administrator 114, the service partner 106 identifies (step 260) approved accounts by the presence of an account number issued by the primary party 102 and populates (step 261) the service partner's database with the primary party's new account numbers. For any unrecognized product control numbers, the service partner 106 produces (step 262) a reject report to be used for operations reconciliation processes. This reject report includes the primary party's account number, if applicable, the card member's name, the product control numbers, and the transaction date. The service partner 106 also produces (step 263) a balancing report containing total records of the received file and transmits (step 264) the report to the primary party 102. After receiving an approved account file from the card service engine 104, the card service engine 104 loads (step 270) the file onto its database, creates (step 271) a daily plastic file, and, periodically, sends (step 272) a plastic embossing file to the card generator 120.

The card generator 120, receives (step 280), periodically, the plastic file from the card service engine 104. Upon receipt of the plastic file, the card generator 120 identifies (step 281) all service partner charge and lending accounts on the primary party's renewal plastic file and transmits (step 282) an identified accounts file of all identified accounts to the service partner 106. The identified accounts file includes information such as the primary party's account numbers, card member 108 names, the card generator processing identifiers, transaction dates, and the primary party's bag ID's. A new identified accounts file is created periodically for renewal and periodic processing. Balancing reports are also sent (step 283) to show the total number of accounts sent to the service partner 106.

Upon receipt of the identified accounts file from the card generator 120, the service partner 106 merges (step 290) the identified accounts file to the service partner 106 database by the primary party's new account numbers. The service partner 106 periodically sorts (step 291) the daily file by approved, declined, and cancelled in numeric sequential order to create a daily membership file with service partner 106 membership information. Finally, the service partner 106 transmits (step 292) the daily membership file to the card generator 120.

For individual members, service partner 106 membership data includes, for example, the service partner membership number, service partner member since date, service partner member type, and a photo image. For business members, the data includes the company name, their resale ID, the resale type, and the resale state. In general, other membership data includes, for example, a photo image flag indicator, the primary party's new account number, the card generator processing indicator, processing data, and the card generator bag-ID.

After transmitting the daily membership file to the card generator 120, the service partner 106 creates (step 293) an exception reject report containing invalid product control numbers, which are account numbers that did not result in a match on the service partner database. The exception reject report is used with the operations reconciliation process and includes the primary party's account number, card member name, transaction date, the card generator processing indicator, and the primary party 102 bag-ID. Finally, the service partner 106 produces (step 294) a balancing report containing the total records of the received identified accounts file. This balancing report is utilized by the information administrator 112 after each transmission for balancing with the card generator 120.

After receiving the updated embossing information file from the service partner 106, the card generator 120 merges (step 284), using the primary party's new account number, the data from the updated embossing information file with the plastic file that was received previously from the card service engine 104. In addition, the card generator 120 embosses all required primary party 102 data, prints a card member number on the signature panel, prints applicable service partner membership data such as that which is described above, on the back of the primary party card, places the service partner membership number in the third magnetic stripe position, converts the service partner membership number to a bar code, prints the bar code on the back of the membership card, and sends the membership card to the card member 108.

In addition, the card generator 120 creates (step 285) a reject report for all non-primary party account numbers or invalid card generator processing indicators received from the service partner 106. This reject report includes all data received on the service partner file except a photo image. The report is labeled "Invalid Accounts Received from Service Partner" and is used for operational reconciliation.

Finally, the card generator 120 re-sends, in a subsequent transmission to the service partner 106, namely account numbers that do not have a service partner membership number. After a predetermined number of attempts, the information is removed from the embossing file and placed on the card generator's reject report. Balancing reports show the total number of accounts received from the service partner 106.

Card Replacement Processes. In an exemplary card replacement process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Regardless to which entities the various process steps are delegated, the card replacement process may be initiated by the primary party 102, in conjunction with the card member 108, or by the service partner 106. Further, special procedures may be called out in cases of fraud or emergency. In an exemplary embodiment, after initial processing, a plastic card replacement process is initiated.

Figure 3A:
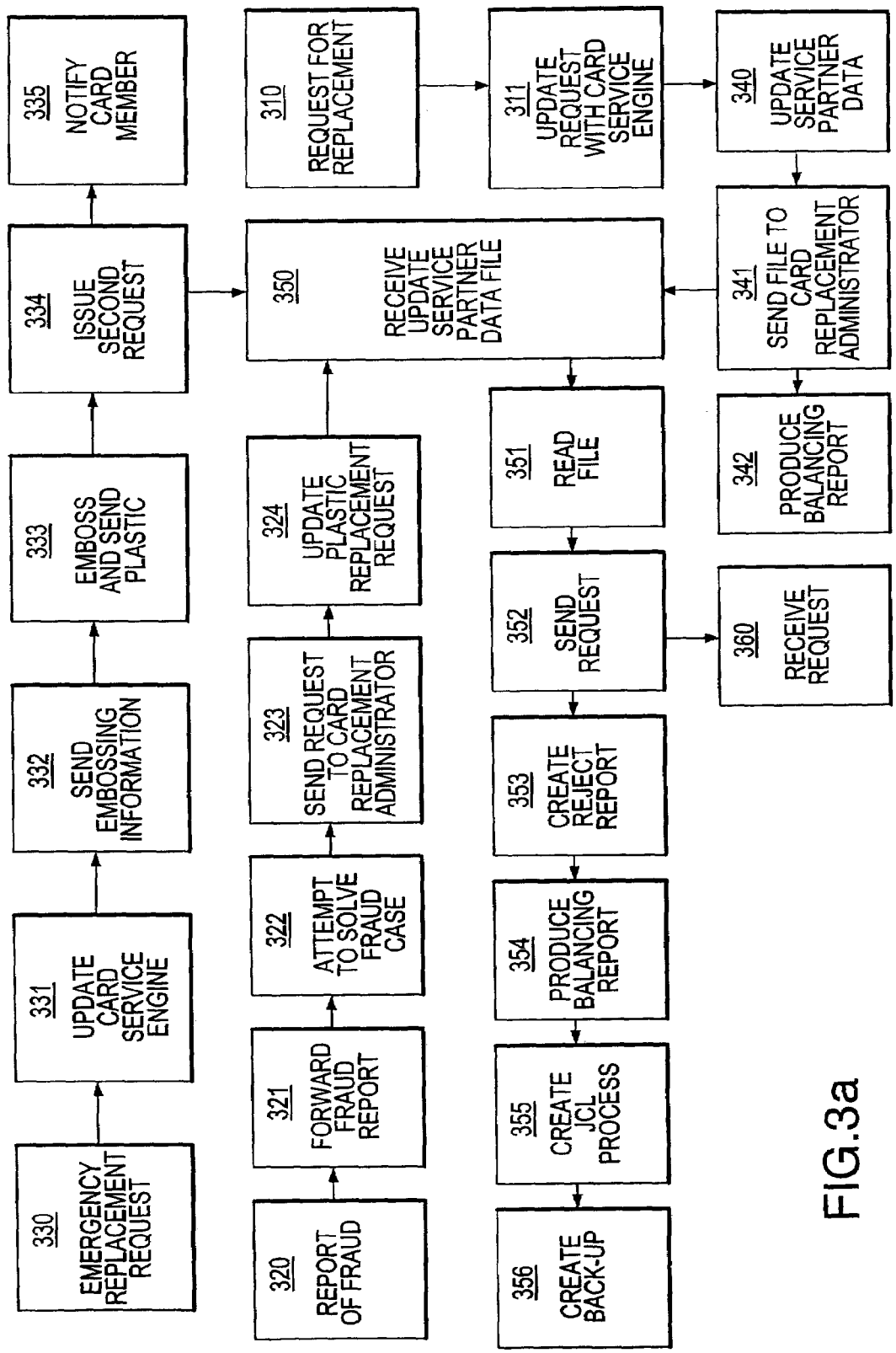
FIG. 3a is a flowchart of a portion of an exemplary multiple-service card replacement process, complementing FIG. 3b, in accordance with the present invention.
Figure 3B:
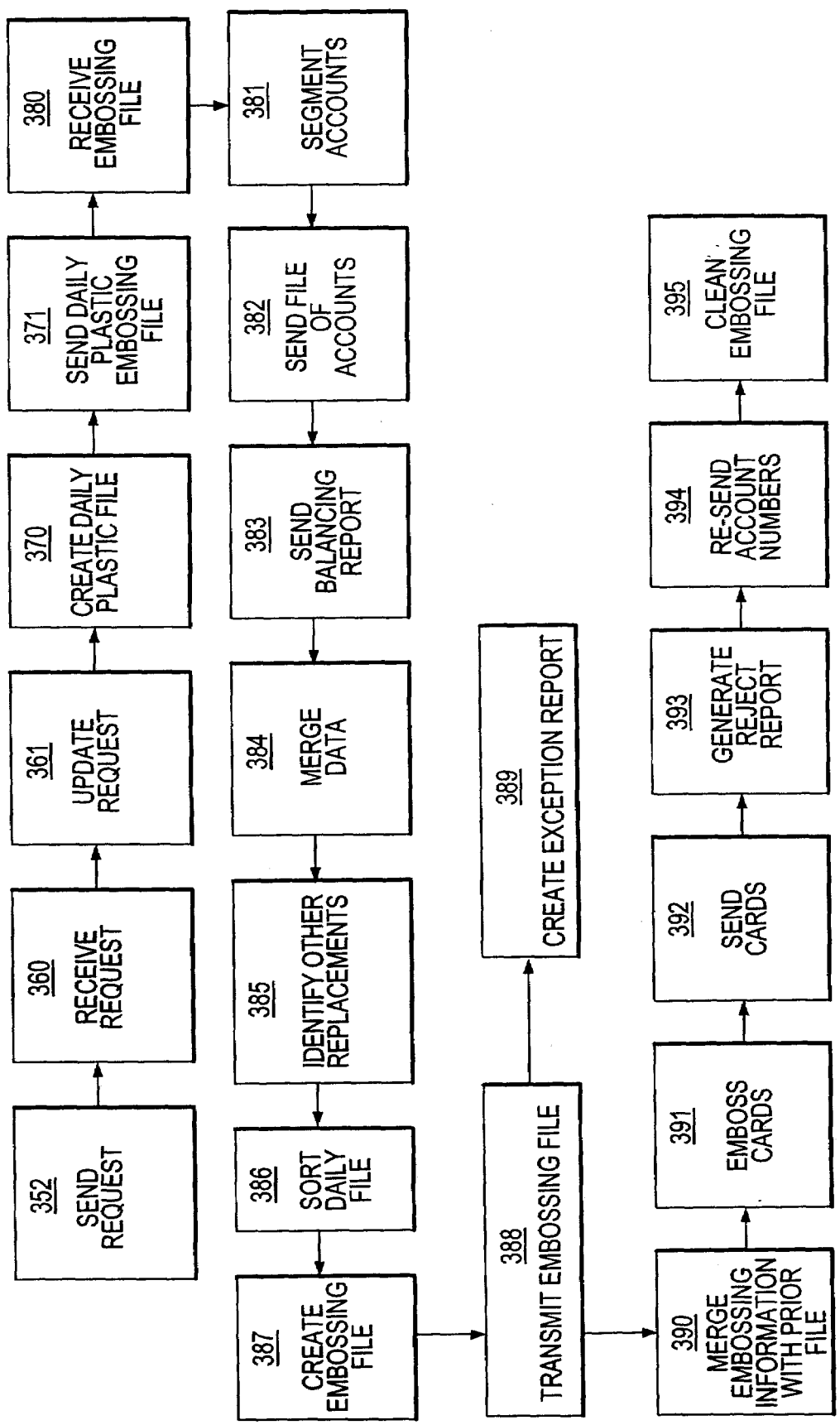
FIG. 3b is a flowchart of a portion of an exemplary multiple-service card replacement process, complementing FIG. 3a, in accordance with the present invention.

Referring to FIGS. 3a and 3b, if a card member 108 requests (step 310) card replacement, the card replacement administrator 116 updates (step 311) the plastic replacement request with the card service engine 104 and thereby initiates the plastic card replacement process. If a card member 108 reports (step 320) fraudulent activity on an account, the report is sent (step 321) to the fraud resolution administrator 118, which attempts (step 322) to solve the case and, if the claim is deemed valid, sends (step 323) a request to the card replacement administrator 116, which updates (step 324) the plastic replacement request with the card service engine 104 and thereby initiates the plastic card replacement process.

If a card member 108 requests (step 330) emergency card replacement, the card replacement administrator 116 updates (step 331) the card service engine 104 to not issue a plastic card and updates the card server, which sends (step 332) embossing information to the card generator 120, which embosses (step 333) the plastic and sends it to the card member 108. In an exemplary embodiment, these emergency cards do not contain any service partner data and expire at the end of the following month unless otherwise requested by the card member 108. In addition, the card replacement administrator 116 issues (step 334) a second request to the card service engine 104 to issue service partner replacement plastic, thereby initiating the standard card replacement process. In cases of emergency card replacement, the card member 108 is notified (step 335), first, that emergency card replacement plastic will preferably not contain service partner membership data and that the card member 108 should seek assistance from the service partner membership desk, second, that multiple-service card re-issuance will occur and will be received within a predetermined period of time, and third, that additional cards on the account may be required to be replaced if the service partner 106 determines that there are changes to membership information.

The service partner 106 may initiate card replacement by updating (step 340) the service partner data and sending (step 341) a file to the card replacement administrator 116 indicating the card members 108 who require new plastic cards. The service partner 106 also produces (step 342) a balancing report containing the total records of the transmitted file and transmits the report to the primary party 102. This report is used by the information administrator 112 after each transmission for balancing with the card generator 120.

After receiving (step 350) the updated service partner data file from the service partner 106, the customer service administrator 114 reads (step 351) the file and sends (step 352) a request to the card replacement administrator 116 to create replacement plastic cards. The customer service administrator 114 also creates (step 353) a reject report with the card replacement administrator 116 indicating service partner replacements that have invalid account numbers. Next, the customer service administrator 114 produces (step 354) a balancing report containing the total records of the transmitted/received file. The customer service administrator 114 also creates (step 355) a job control language process to execute the information administrator's balancing job. Finally, the customer service administrator 114 creates (step 356) a back-up of the service partner replacement request file and balancing reports for a predetermined period of time, for example, 90 days.

Upon receipt (step 360) of the request from the customer service administrator 114 to create replacement plastic cards, the card replacement administrator 116 updates (step 361) the plastic replacement request with the card service engine 104 and thereby initiates the plastic card replacement process.

As previously stated, the plastic card replacement process is initiated by a party's updating the plastic replacement request with the card service engine 104. Upon receipt of such an update, the card service engine 104 creates (step 370) a daily plastic file and sends (step 371) a daily plastic embossing file to the card generator 120.

Upon receipt (step 380) of the daily plastic embossing file from the card service engine 104, the card generator 120 segments (step 381) service partner accounts and sends (step 382) a file of all identified service partner accounts to the service partner 106. This file is transmitted daily and contains the primary party's account number, the card member's name, the card generator processing identifier, transaction date, and the primary party's bag ID. Separate files are created for renewal and daily processing. Balancing reports are also sent (step 383) showing total number of accounts sent to the service partner 106.

Upon receipt (step 382) of the file showing all identified service partner accounts, the service partner 106 merges (step 384) the data contained in the file to the service partner database according to the primary party's new account number. At this point, the service partner 106 may also need to determine (step 385) whether additional card members 108 in the relationship require their cards to be replaced due to any changes in service partner membership data. Next, the service partner 106 sorts (step 386) the daily file by the basic cards first, then the supplemental cards, in numeric sequential order. In addition, the service partner 106 creates (step 387) an embossing information file with any new service partner membership data and transmits (step 388) the embossing information file to the card generator 120. The service partner 106 also creates (step 389) an exception reject report for account numbers that did not result in a match on the service partner database. This report is for use with the operations reconciliation process and includes the primary party's account number, card member's name, transaction date, the card generator processing indicator, and the primary party bag-ID. Finally, the service partner produces a balancing report containing total records of the received file.

Upon receipt of the embossing information file from the service partner 106, the card generator 120 merges (step 390) the data from the service partner's embossing information file with the daily plastic embossing file previously received from the card service engine 104. For new account numbers that do not have a service partner membership number, plastic cards will not be embossed. Next, the card generator 120 embosses (step 391) the plastic cards and sends (step 392) the replacement cards to the card members

108. The card generator 120 also generates (step 393) a reject report for all non-primary party account numbers or invalid card generator processing indicators received from the service partner 106. This report includes all data received on the service partner file except the photo image. The report is labeled "invalid accounts received from service partner," and the report is used for operational reconciliation. Finally, the card generator 120 re-sends (step 394) to the service partner account numbers that did not have a service partner membership number. These account numbers are sent in a subsequent transmission. After a predetermined number of attempts, the information is removed (step 395) from the embossing file and placed on the PDR reject report.

Figure 4:
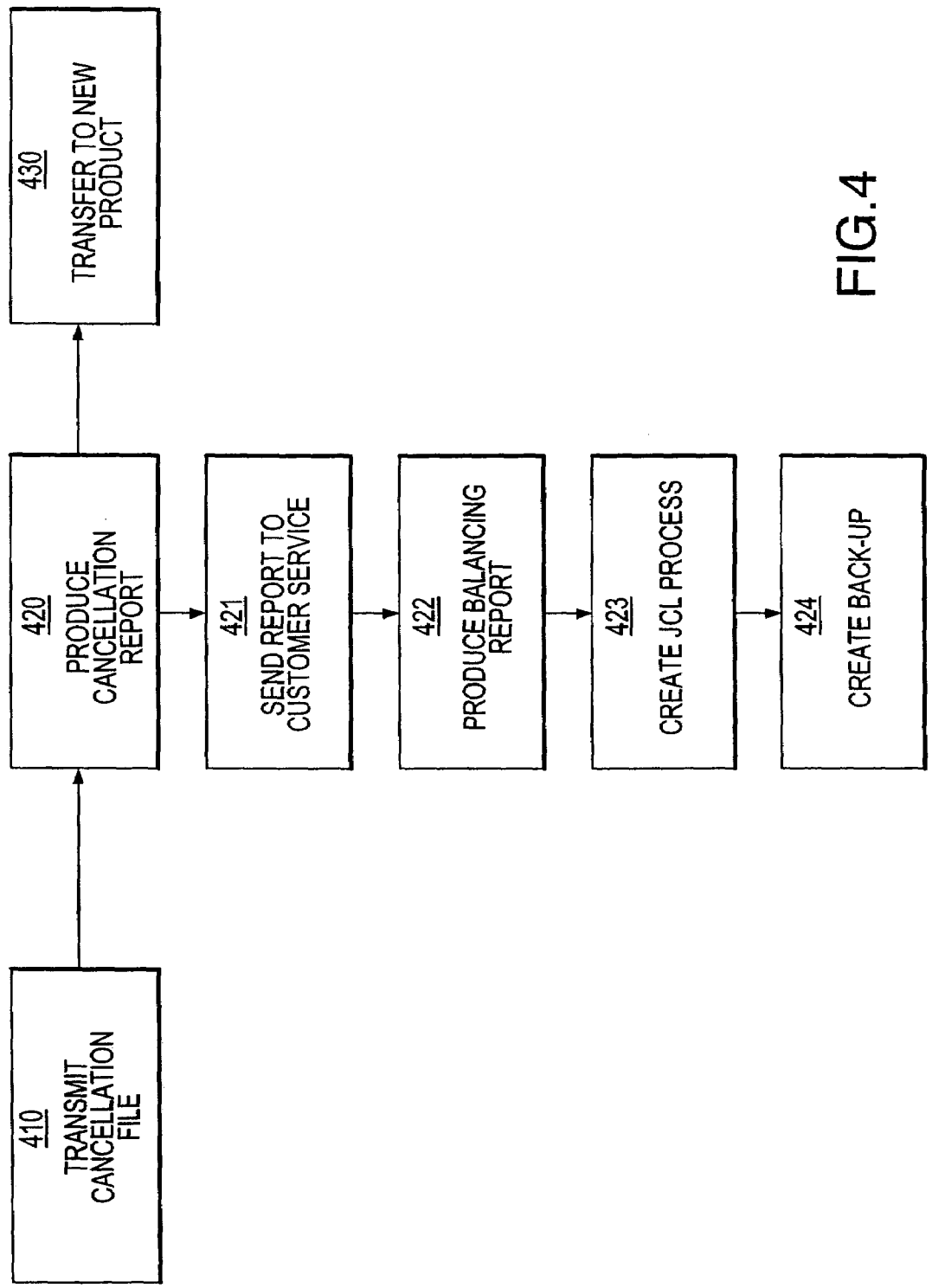
FIG. 4 is a flowchart of an exemplary multiple-service card service partner membership cancellation process in accordance with the present invention.

Card Maintenance Processes/Service Partner Membership Cancellation: In an exemplary service partner membership cancellation process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Referring to FIG. 4, regardless to which entities the various process steps are delegated, the service partner membership cancellation process is initiated by the service partner 106, which transmits (step 410) a cancellation file to the primary party 102. The cancellation file contains data elements for all the primary party 102 card members 108 who have cancelled their service partner memberships. These data elements include the cancellation date, the primary party's new account number, and the card member's name.

Upon receipt of the cancellation file from the service partner 106, the primary party 102 produces (step 420) a service partner membership cancellation report on the report generator. This report is used by card service providers to transfer (step 430) card members 108 to a new product. The primary party 102 also sends (step 421) a report to the customer service administrator 114 and produces (step 422) a balancing report containing total records of the received cancellation file. In addition, the primary party 102 creates (step 423) a job control language process to execute the information administrator balancing job. Finally, the primary party 102 creates (step 424) a backup of the service partner's cancellation file and balancing reports for 90 days.

Figure 5A:
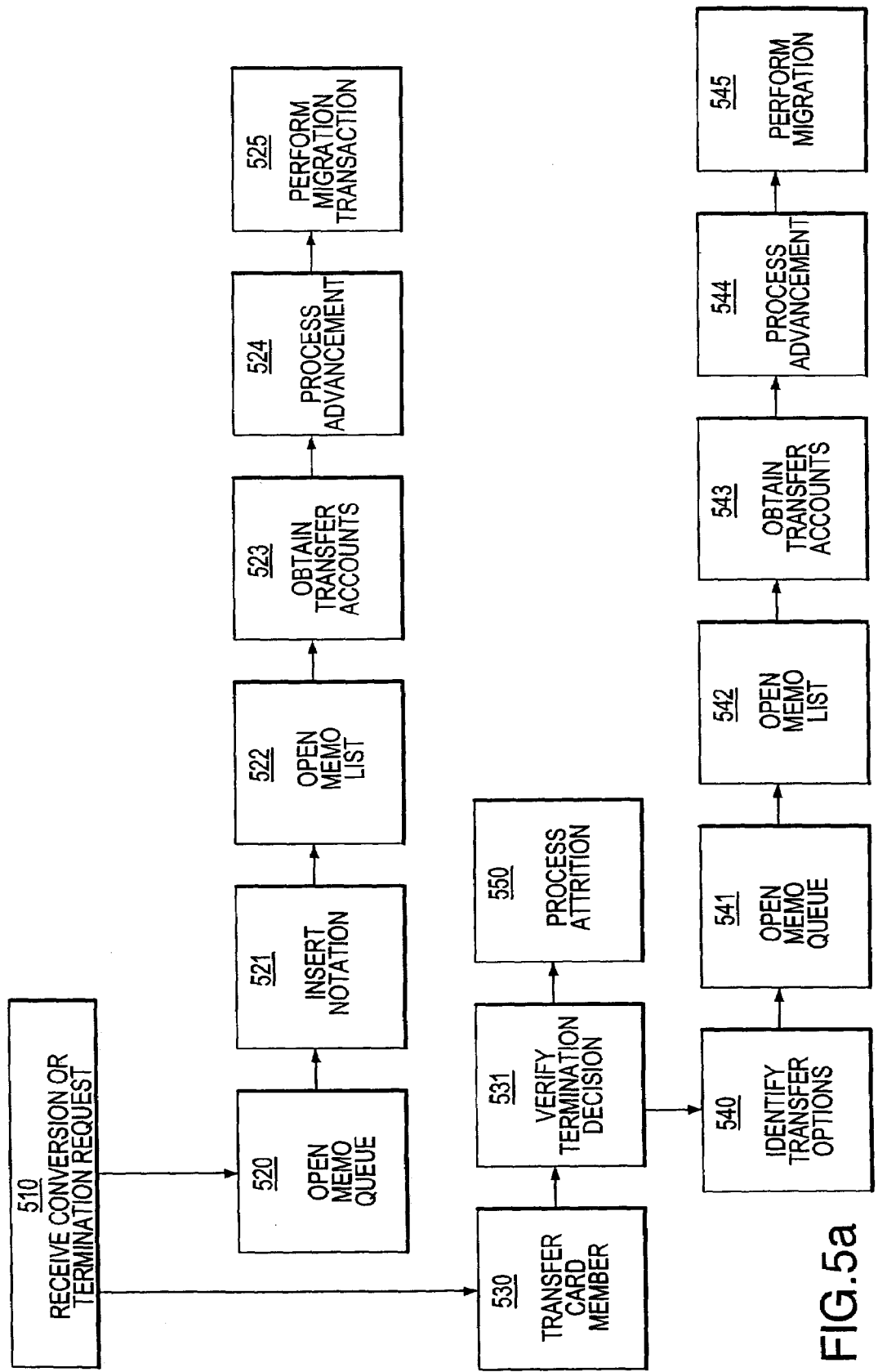
FIG. 5a is a flowchart of a portion of an exemplary multiple-service card primary party cancellation process, complementing FIG. 5b, in accordance with the present invention.
Figure 5B:
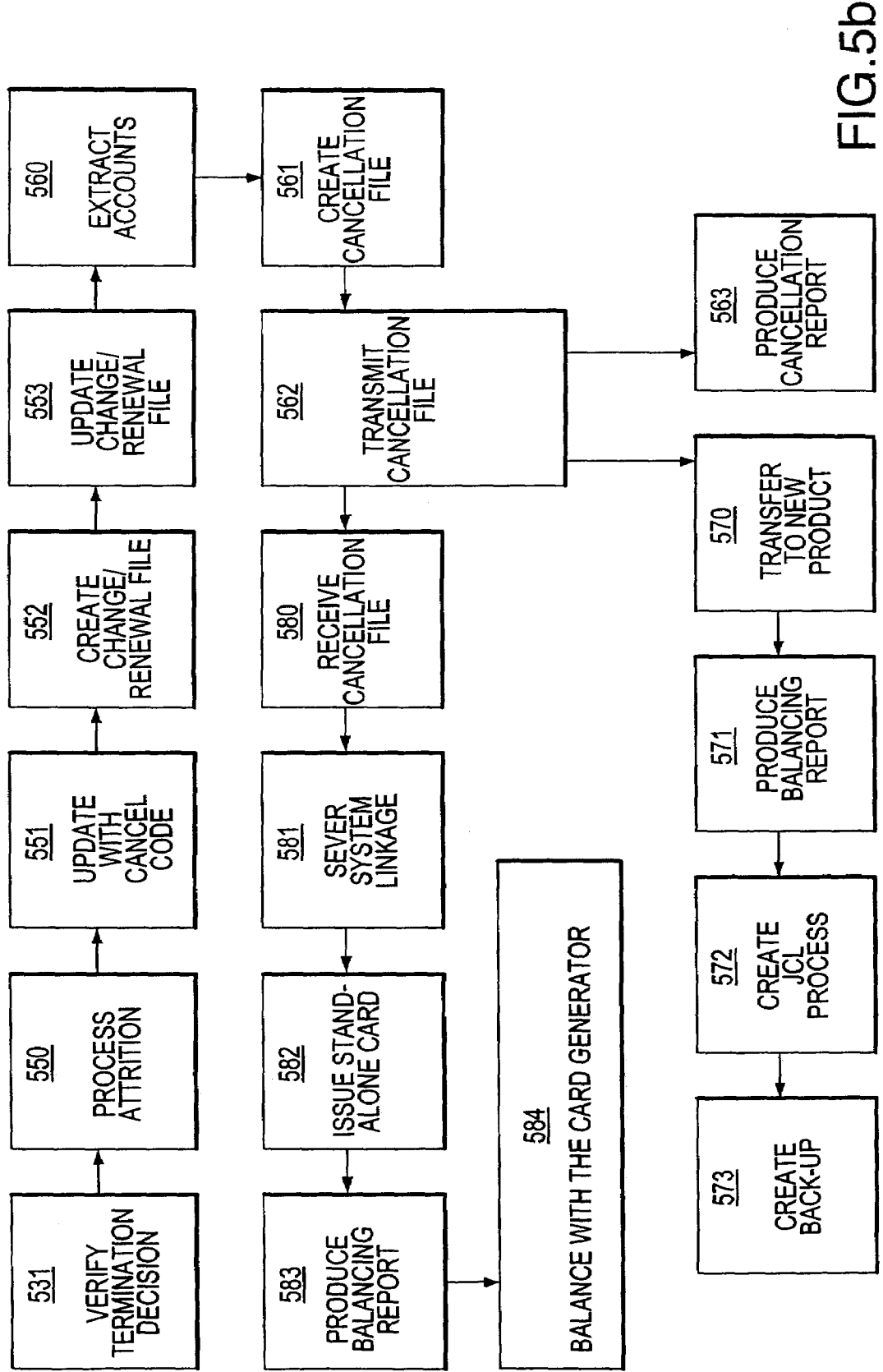
FIG. 5b is a flowchart of a portion of an exemplary multiple-service card primary party cancellation process, complementing FIG. 5a, in accordance with the present invention.

Card Maintenance Processes/Primary Party Card Member Cancellations or Transfers to non-Service Partner Products: In an exemplary card member cancellation process, multiple process participants cooperate to accomplish the process steps. The process participants may include only the primary party 102, the card service engine 104, and the service partner 106, but those participants may also delegate their responsibilities to entities within their respective organizations or to other entities. Furthermore, the card service engine 104 may be the same party as either the primary party 102 or the service partner 106. Referring to FIGS. 5a and 5b, regardless to which entities the various process steps are delegated, the card member cancellation process is initiated by the primary party's customer service administrator's 114 receiving (step 510) a request from a card member 108 to terminate or convert to another product.

If the card member 108 requests not to terminate, and the card member 108 specifies a product, to which the card member 108 wants to transfer, the customer service administrator 114 opens (step 520) a memo queue and inserts (step 521) a notation indicating that the card member 108 wants to transfer to a specific product. In addition, the customer service administrator 114 opens (step 522) a memo list and obtains (step 523) accounts that must be transferred to a new IA. Finally, the customer service administrator 114 processes (step 524) the advancement of the rebate and performs the migration transaction to move the card member 108 to the new product.

If the card member 108 wants to terminate, or if the card member 108 fails to specify a product, to which the card member 108 wants to transfer, the customer service administrator 114 dial transfers (step 530) the card member 108 to the membership administrator, which verifies (step 531) that the card member 108 wants to terminate.

If the card member's desire to terminate cannot be verified, the membership administrator identifies (step 540) card member transfer options and opens (step 541) a memo queue specifying the product, to which the card member 108 wants to transfer. In addition, the customer service administrator 114 opens (step 542) a memo list and obtains (step 543) accounts that must be transferred to a new IA. Finally, the customer service administrator 114 processes (step 544) the advancement of the rebate and performs (step 545) the migration transaction to move the card member 108 to the new IA.

If the card member's 108 desire to terminate is verified, the membership administrator processes (step 550) the attrition, causing the card service engine 104 to update (step 551) the file with a cancel code. In addition, the card service engine 104 creates (step 552) and/or updates (step 553) the change/renewal file with the transfer code for extraction by the customer service administrator 114.

Once the customer service administrator 114 has extracted (step 560) service partner/primary party accounts from the change/renewal file, the customer service administrator 114 creates (step 561) a cancellation file of all card members 108 who have cancelled their multiple-service card. Next, the customer service administrator 114 transmits (step 562) the cancellation file to the service partner 106 and produces (step 563) a primary party/service partner co-brand card cancellation report on the report generator. This report will be utilized by card provider services to transfer (step 570) card members 108 to a new primary party product. The customer service administrator 114 also produces (step 571) a balancing report containing total records of the transmitted file and creates (step 572) a job control language process to execute the information administrator balancing job. Finally, the primary party 102 creates (step 573) a backup of the service partner cancellation file and balancing reports for 90 days.

Upon receipt (step 580) of the primary party's cancellation file from the customer service administrator 114, the service partner 106 turns the credit flag indicator to N, thereby severing (step 581) the system linkage. In this situation, the service partner 106 may issue (step 582) a stand alone membership card. Finally, the service partner 106 produces (step 583) a balancing report containing the total records of the transmitted file. This balancing report will be utilized (step 584) by the information administrator 112 after each transmission for balancing with the card generator 120.

As one skilled in the art will appreciate, the above described transaction entry interface, as well as any or all other aspects of the present invention, may include any suitable form of encryption and/or other security measures either currently known or hereafter devised.

The present invention provides a system and method for a RF operable transaction instrument configured to manage multiple data sets (e.g., "application tenants") of differing formats associated with a plurality of distinct transaction account issuers. In this context, an "application tenant" may include all or any portion of any data sets which are substantially correlated to an account issuer, which the issuer may additionally use to substantially identify an instrument user or related account. For example, where the account issuer provides application tenant information, the application tenant may include, inter alia, a membership identifier associated with a user enrolled in a issuer provided transaction account program, and all related subsets of data stored on the transaction instrument. Where multiple application tenants are referred to herein, each tenant may constitute its own distinct data set, independent of any other application tenant data sets. For example, each application tenant may include a unique membership identifier and all associated subsets of data. Alternatively, an application tenant may include a membership identifier and an application for processing all data owned by an issuer. Thus, the data set or subset may include the processing application. Moreover, differing formats, as discussed herein, include differences in all or any portion of the formats. As such, "application tenant" and "distinct data set," and data set "owner" and account "issuer" may be used interchangeably herein.

In addition, it should be noted that although the present invention is described with respect to a financial transaction instrument, the invention is not so limited. The invention is suitable for any instrument capable of storing distinct data sets which may be provided by multiple distinct account issuers where the distinct data sets may be formatted one different from another. The account may be, for example, a calling card, a loyalty, debit, credit, incentive, direct debit, savings, financial, membership account or the like. While the information provided by the account issuers may be described as being "owned" by the issuers, the issuers or their designees may simply be a manager of the account.

The present invention may be described herein in terms of functional block components, optional selections and/or various processing steps. It should be appreciated that such functional blocks may be realized by any number of hardware and/or software components configured to perform the specified functions. For example, the present invention may employ various integrated circuit components (e.g., memory elements, processing elements, logic elements, look-up tables, and/or the like), which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like. For a basic introduction of cryptography and network security, the following may be helpful references: (1) "Applied Cryptography: Protocols, Algorithms, And Source Code In C," by Bruce Schneier, published by John Wiley & Sons (second edition 1196); (2) "Java Cryptography," by Jonathan Knudson, published by O'Reilly & Associates (1998); and (3) "Cryptography and Network Security: Principles and Practice," by Mayiam Stalling, published by Prentice Hall; all of which are hereby incorporated by reference.

As used herein, the terms "user," "end user," "consumer," "customer" or "participant" may be used interchangeably with each other, and each shall mean any person, entity, machine, hardware, software and/or business. Furthermore, the terms "business" or "merchant" may be used interchangeably with each other and shall mean any person, entity, machine, hardware, software or business. Further still, the merchant may be any person, entity, software and/or hardware that is a provider, broker and/or any other entity in the distribution chain of goods or services. For example, the merchant may be a ticket/event agency (e.g., Ticketmaster, Telecharge, Clear Channel, brokers, agents).

The systems and/or components of the systems discussed herein may also include one or more host servers or other computing systems including a processor configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including client data, merchant data, financial institution data and/or like data that could be used in association with the present invention. As those skilled in the art may appreciate, the user interface for each system described herein may typically include an operating system (e.g., Windows NT, 195/98/2000, Linux, Solaris, etc.) as well as various conventional support software and drivers typically associated with computers. The user computer and other systems described herein can be in a home or business environment with access to a network. In an exemplary embodiment, access is through the Internet through a commercially-available web-browser software package.

Communication between various elements of the present invention is accomplished through any suitable communication means, such as, for example, a telephone network, intranet, Internet, point of interaction device (point of sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., Gilbert Held, "Understanding Data Communications," (1996), hereby incorporated by reference.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the customer computer may employ a modem to occasionally connect to the Internet, whereas the bank computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols," (1998); "Java 12 Complete," various authors (Sybex 1999); Deborah Ray and Eric Ray, "Mastering HTML 14.0"(1997); Loshin, "TCP/IP Clearly Explained," (1997). All of these texts are hereby incorporated by reference.

It may be appreciated that many applications of the present invention could be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 198, Windows 195, MacOS, OS/2, BeOS, Linux, UNIX, Solaris or the like. Moreover, although the invention is frequently described herein as being implemented with TCP/IP communications protocols, it may be readily understood that the invention could also be implemented using IPX, Appletalk, IP-6, NetBIOS, OSI or any number of existing or future protocols. Moreover, the present invention contemplates the use, sale or distribution of any goods, services or information over any network having similar functionality described herein.

In accordance with various embodiments of the invention, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

The financial transaction instrument (e.g., smart card, magnetic stripe card, bar code card, optical card, biometric device, radio frequency card or transponder and/or the like) may communicate to the merchant, information from one or more data sets associated with the financial transaction instrument. In one example, membership data and credit card data associated with an account or card may be transmitted using any conventional protocol for transmission and/or retrieval of information from an account or associated transaction card (e.g., credit, debit, loyalty, etc.). In one exemplary embodiment, the transaction instrument may be configured to communicate via RF signals. As such, the data contained on the instrument may be communicated via radio frequency signals.

A financial transaction instrument may include one or more physical devices used in carrying out various financial transactions. For example, a financial transaction instrument may include a rewards card, charge card, credit card, debit card, prepaid card, telephone card, smart card, magnetic stripe card, radio frequency card/transponder and/or the like. In yet another exemplary embodiment of the present invention, a financial transaction instrument may be an electronic coupon, voucher, and/or other such instrument.

The financial transaction instrument in accordance with this invention may be used to pay for acquisitions, obtain access, provide identification, pay an amount, receive payment, redeem reward points and/or the like. In the radio frequency ("RF") embodiments of the transaction instrument, instrument to instrument transactions may also be performed. See, for example, Sony's "Near Field Communication" ("NFC") emerging standard which is touted as operating on 113.56 MHz and allowing the transfer of any kind of data between NFC enabled devices and across a distance of up to twenty centimeters. See also, Bluetooth chaotic network configurations; described in more detail at http://www.palowireless.com/infotooth/whatis.asp, which is incorporated herein by reference. Furthermore, data on a first RF device may be transmitted directly or indirectly to another RF device to create a copy of all or part of the original device.

Furthermore, financial transaction instrument as described herein may be associated with various applications which allow the financial transaction instruments to participate in various programs, such as, for example, loyalty programs. A loyalty program may include one or more loyalty accounts. Exemplary loyalty programs include frequent flyer miles, on-line points earned from viewing or purchasing products or websites on-line and programs associated with diner's cards, credit cards, debit cards, hotel cards, calling cards, and/or the like. Generally, the user is both the owner of the transaction card account and the participant in the loyalty program; however, this association is not necessary. For example, a participant in a loyalty program may gift loyalty points to a user who pays for a purchase with his own transaction account, but uses the gifted loyalty points instead of paying the monetary value.

For more information on loyalty systems, transaction systems, and electronic commerce systems, see, for example, U.S. Utility patent application Ser. No. 10/304, 251, filed on Nov. 16, 1002, by inventors Antonucci, et al., and entitled "System and Method for Transfer of Loyalty Points"; U.S. Continuation-In-Part patent application Ser. No. 10/378,456, filed on Mar. 13, 1003, by inventors Antonucci, et al., and entitled "System and Method for the Real-Time Transfer of Loyalty Points Between Accounts"; U.S. patent application Ser. No. 09/836,213, filed on Apr. 17, 1001, by inventors Voltmer, et al., and entitled "System And Method For Networked Loyalty Program"; U.S. Continuation-In-Part patent application Ser. No. 10/027,984, filed on Dec. 10, 1001, by inventors Ariff, et al., and entitled "System And Method For Networked Loyalty Program"; U.S. Continuation-In-Part patent application Ser. No. 10/010,947, filed on Nov. 16, 1001, by inventors Haines, et al., and entitled "System And Method For Networked Loyalty Program"; U.S. Continuation-In-Part patent application Ser. No. 10/084,744, filed on Feb. 16, 1002, by inventors Bishop, et al., and entitled "System And Method For Securing Data Through A PDA Portal"; the Shop AMEX™ system as disclosed in Ser. No. 10/230,190, filed Sep. 15, 2000; the Loyalty As Currency™ and Loyalty Rewards Systems disclosed in Ser. No. 10/197,296, filed on Apr. 14, 2000, Ser. No. 10/200,492, filed Apr. 18, 2000, Ser. No. 10/201,114, filed May 12, 2000; a digital wallet system disclosed in U.S. Ser. No. 09/652,899, filed Aug. 11, 2000; a stored value card as disclosed in Ser. No. 09/241,188, filed on Feb. 11, 1999; a system for facilitating transactions using secondary transaction numbers disclosed in Ser. No. 09/800,461, filed on Mar. 17, 2001, and also in related provisional applications Ser. No. 10/187,620, filed Mar. 17, 2000, Ser. No. 10/200,625, filed Apr. 18, 2000, and Ser. No. 10/213,323, filed May 12, 2000, all of which are herein incorporated by reference. Other examples of online loyalty systems are disclosed in "Netcentives," U.S. Pat. No. 5,774,870, issued on Jun. 10, 1998, and U.S. Pat. No. 5,009,412, issued on Dec. 19, 1999, both of which are hereby incorporated by reference.

Further still, a "code," "account," "account number," "identifier," "loyalty number" or "membership identifier," as used herein, includes any device, code, or other identifier/indicia suitably configured to allow the consumer to interact or communicate with the system, such as, for example, authorization/access code, personal identification number (PIN), Internet code, other identification code, and/or the like that is optionally located on a rewards card, charge card, credit card, debit card, prepaid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device. A customer account number may be, for example, a sixteen-digit credit card number, although each credit provider has its own numbering system, such as the fifteen-digit numbering system used by an exemplary loyalty system. Each company's credit card numbers comply with that company's standardized format such that the company using a sixteen-digit format may generally use four spaced sets of numbers, as represented by the number "0000 0000 0000 0000." The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. In addition, loyalty account numbers of various types may be used.

Further yet, the "transaction information" in accordance with this invention may include the nature or amount of transaction, as well as, a merchant, user, and/or issuer identifier, security codes, or routing numbers, and the like. In various exemplary embodiments of the present invention, one or more transaction accounts may be used to satisfy or complete a transaction. For example, the transaction may be only partially completed using the transaction account(s) correlating to the application tenant information stored on the transaction instrument with the balance of the transaction being completed using other sources. Cash may be used to complete part of a transaction and the transaction account associated with a user and the transaction instrument, may be used to satisfy the balance of the transaction. Alternatively, the user may identify which transaction account, or combination of transaction accounts, stored on the transaction instrument the user desires to complete the transaction. Any known or new methods and/or systems configured to manipulate the transaction account in accordance with the invention may be used.

In various exemplary embodiments, the financial transaction instrument may be embodied in form factors other than, for example, a card-like structure. As already mentioned, the financial transaction instrument may comprise an RF transponder, a speed pass, store discount card, or other similar device. Furthermore, the financial transaction instrument may be physically configured to have any decorative or fanciful shape including key chains, jewelry and/or the like. The financial transaction instrument may furthermore be associated with coupons. A typical RF device which may be used by the present invention is disclosed in U.S. application Ser. No. 10/192,488, entitled "System And Method For Payment Using Radio Frequency Identification In Contact And Contactless Transactions," and its progeny, which are all commonly assigned, and which are all incorporated herein by reference.

As used herein, the term "data set" may include any set of information and/or the like which may be used, for example, in completing a transaction. For example, data sets may include information related to credit cards, debit cards, membership clubs, loyalty programs, speed pass accounts, rental car memberships, frequent flyer programs, coupons, tickets and/or the like. This information may include membership identifiers, account number(s), personal information, balances, past transaction details, account issuer routing number, cookies, identifiers, security codes, and/or any other information. The data set may additionally include an issuer defined management process for determining which subsets of data are to be provided to an issuer or merchant. In some instances, a data set may be associated with one or more account numbers corresponding to accounts maintained by the account issuer.

The various data sets associated with a financial transaction instrument may either be stored on the financial transaction instrument itself or remotely. In one exemplary embodiment, the financial transaction instrument itself is configured to store at least two data sets. In other exemplary embodiments, data sets may be stored in one or more databases and the data sets are affiliated with the financial transaction instrument. For example, a central database on the instrument may store multiple distinct data sets correlated with a unique issuer. The data sets stored on the remote database may be stored thereon, in such a manner as to mimic the corresponding data sets stored on the transaction instrument. The multiple distinct data sets may be accessed, for example, by a merchant system, whether stored on the transaction instrument or remote database stand alone device, and/or a computer user interface, via a network. In this example, the financial transaction instrument may include one or more user identifiers (e.g., membership identifiers), which may be used to provide access to a subset of data included on the financial transaction instrument.

Various information and data are described herein as being "stored." In this context, "stored" may mean that the information is kept on a database. In accordance with the invention, a database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. A database may be organized in any suitable manner, including as data tables or lookup tables. Association of certain data may be accomplished through any data association technique known and/or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Although all data sets associated with a particular financial transaction instrument may be owned by the same owner, it is contemplated that in general, some of the data sets stored on the financial transaction instrument have different owners. Furthermore, the storage of data sets is configured to facilitate independent storage and management of the data sets on the financial transaction instrument. Further still, the data sets may be stored in distinct differing formats provided by the distinct issuer or data set owner (also called "issuer," herein). The owners of data sets may include different individuals, entities, businesses, corporations, software, hardware, and/or the like. However, one skilled in the art will appreciate that the owners may also include different divisions or affiliates of the same corporation or entity.

A data set may contain any type of information stored in digital format. For example, a data set may include account numbers, programs/applications, scripts, cookies, instruments for accessing other data sets, and/or any other information.

As discussed above, many issuers of existing financial transaction instruments utilize predetermined formats for account numbers, data and/or applications stored in association with the financial transaction instrument. Similarly, the data storage media associated with these financial transaction instruments are typically configured to accommodate specific predetermined data formats. Thus, since the data format associated with a first issuer is often different from a data format of a second issuer, storage of multiple distinct data of differing formats on a single device provides complications for conventional systems. This is true since, each issuer typically maintains an account processing system that uses a processing protocol different from other issuers, and the information stored on the transaction card relative to the issuer must be formatted accordingly. As such, to ensure the security and integrity of the issuer-owned data, the loading of data on a transaction instrument is typically performed by an issuer or a third-party provider who typically uploads all related and similarly formatted data sets onto the transaction instrument. However, since the third party may typically only be authorized by the issuer to load issuer-owned data of similar format onto an issuer-provided transaction device, including differently formatted data sets on a single transaction device by the third party is often not permitted. More particularly, independent owners of data sets are often reluctant to conform their data set formats to a "standard format" because of the security advantages of maintaining a separate, distinct, often secreted format.

In contrast, and in accordance with an exemplary embodiment of the present invention, the format of the information stored in the present invention may vary from one data set to another. That is, the present invention permits the data to be stored on the financial transaction instrument in any format, and more particularly, in any format recognizable by the data owner/transaction instrument issuer. Thus, as noted, each data set may be used for a very wide variety of purposes including storage of applications, raw data, cookies, coupons, membership data, account balances, loyalty information, and/or the like.

In accordance with one aspect of the present invention, any suitable data storage technique may be utilized to store data without a standard format. Data sets may be stored using any suitable technique, including, for example, storing individual files using an ISO/IEC 17816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 17816-6 data elements; stored as ungrouped data elements encoded using ISO/IEC Abstract Syntax Notation (ASN.1) as in ISO/IEC 18824 and 18825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, memory recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuers. Each of these three exemplary data sets may contain different information that is stored using different data storage formats and/or techniques. Further, each data set may contain subsets of data which also may be distinct from other subsets.

Even further, where the invention contemplates the use of a self-service user interaction device. In this context, the self-service user interaction device may be any device suitable for interacting with a transaction instrument, and receiving information from the transaction instrument user and providing the information to a merchant, account issuer, account manager, data set owner, merchant point of sale, and the like. For example, the self-service user interaction device may be a stand alone read write device, self-service Kiosk, merchant point of sale, read/write device, and the like. In one example, the self-service user interaction device may be configured to communicate information to and from the transaction device and to manipulate the data sets stored thereon. The self-service interaction device may be in communication with the various components of the invention using any communications protocol.

Figure 6:
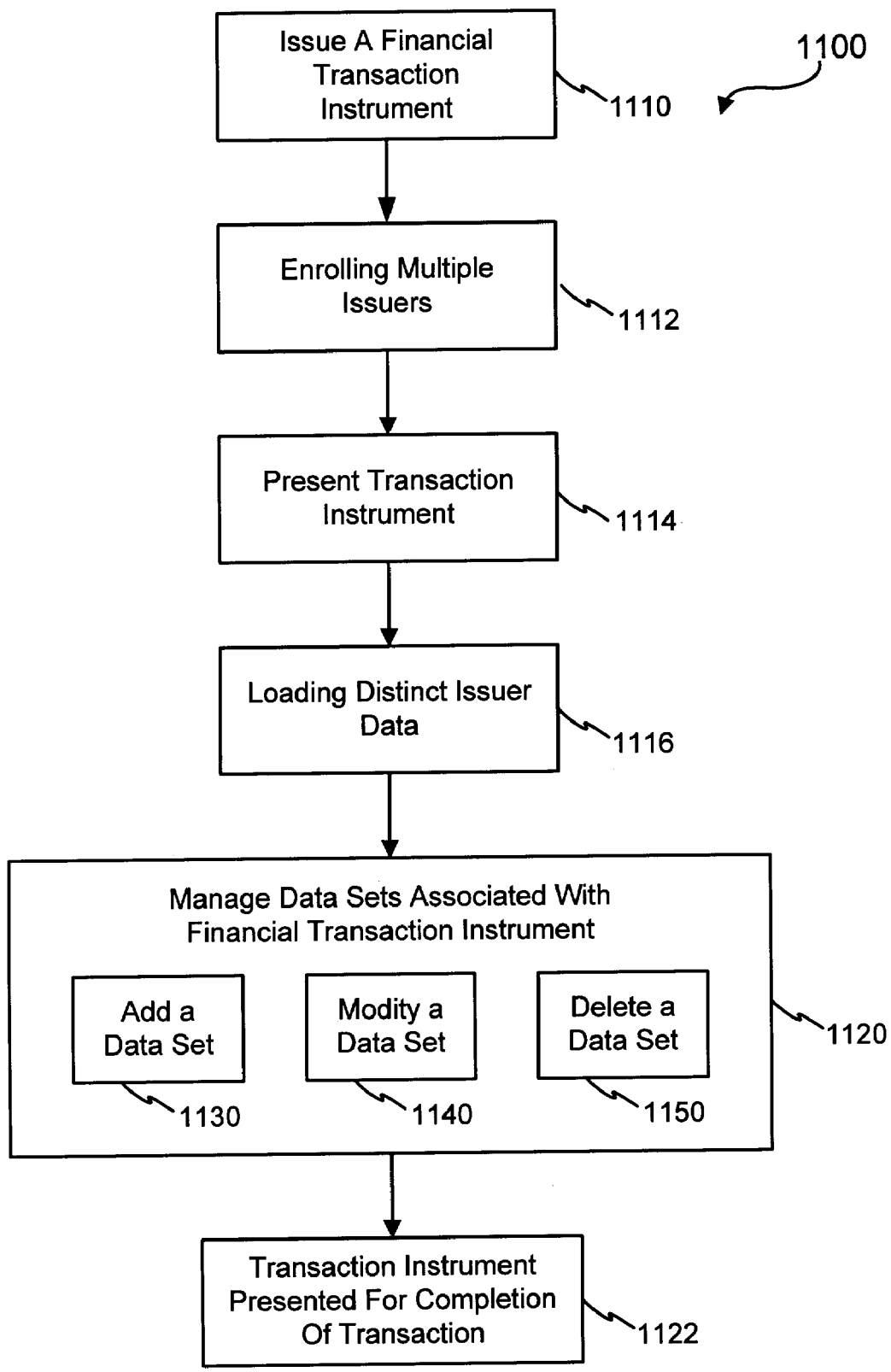
FIG. 6 illustrates a general overview of an exemplary data set management method in accordance with an exemplary embodiment of the present invention.

In general, systems and methods disclosed herein, are configured to facilitate the management of multiple distinct data sets associated with a financial transaction instrument. Management of data sets may include such steps as adding, augmenting, updating and/or deleting data sets associated with the financial transaction instrument. Such manipulations of the data may occur without replacing or reissuing the financial transaction instrument. With reference to FIG. 6, an exemplary method 1100 according to the present invention is shown. Method 1100 may include issuing a financial transaction instrument issued to a transaction device user (step 1110), enrolling multiple data set owners in a multiple account on a transaction device program (step 1112), and managing data sets associated with the financial transaction instrument (step 1120). In managing the data, the method 1100 may determine, for example, whether the data should be added to a data set (step 1130), modified (step 1140) or deleted (step 1150), as described more fully below. Once the data is appropriately managed, the financial transaction instrument user may present the data contained on the instrument to a merchant system for completion of a transaction.

The system may be further configured such that, during an exemplary transaction, data sets associated with the financial transaction instrument may be managed. For example, the user may be prompted (e.g., on a screen, by electronic voice, by a store clerk, by a signal and/or the like) as to the possibility of adding, for example, a loyalty account to the same financial transaction instrument and the user may also be presented with terms and/or conditions in a similar or different manner. The user may be prompted at any time during the transaction, but preferably the user is prompted at the completion of the transaction. If the user accepts the invitation to add data to the financial transaction instrument, a new data set may be added (step 1130) and/or an existing data set is updated (step 1140). For example, if data is to be updated, the stand alone may locate appropriate data to be updated on the transaction device, and make the updates ("modifications") in accordance with data owner instructions. If the data is to be added, the stand alone device may be configured to provide any account information (e.g., account identifier, security code, data owner routing number, etc.) to the transaction device for storage thereon. The stand alone may locate an appropriate database location on transaction instrument for storing the added data. The stand alone device facilitates storage of the data in a distinct location on the transaction device database, where the data is stored independently of any other data. In a preferred embodiment of the invention, the data is added to a database location on the transaction device which reserved for independently storing all data owned by a particular data set owner. Alternatively, the data may be stored in a distinct location on the transaction device, which is a separate location than is used to store any other data set. Further still, the data set is stored in accordance with any storage protocol permitting the data to be stored and retrieved independently of other data.

The adding and updating of the data may be verified by the issuer, prior to making the modifications. If verified, all databases containing the data set to be updated or a mirror image of the data set to be updated, are modified in accordance with the user or issuer provided instructions, and/or the issuer defined data storage protocol or format.

In one exemplary embodiment, multiple account issuers may be enrolled in a multiple account management program using a financial transaction instrument in accordance with the invention (step 1112). For example, permission for adding account issuer owned data may be obtained from the data set owner. The data set owner may then be requested to provide account information to be stored on a transaction instrument. The data set owner may then provide account information relative to a distinct user account for loading onto the transaction instrument in accordance with the present invention. The issuers may be enrolled prior to issuance of the instrument or the issuers may be enrolled after issuance. By enrolling in the management program, the issuer may provide authorization for including the issuer-owned data on the financial transaction instrument. The issuer-owned data may be included (e.g., added, deleted, modified, augmented, etc.) on the transaction instrument using a stand alone interaction device, merchant system, or user personal computer interface upon presentment of the transaction device to the stand alone interaction device 1290 (step 1114). The stand alone interaction device may manipulate the issuer-owned data while preserving a format recognizable by an issuer account management system. For example, the stand alone device may identify the appropriate header or trailer associated with the data and add, delete or modify the data accordingly. The stand alone may manipulate the data using any manipulation instruction or protocol as provided by the data set owner so that the resulting manipulated data is in a format recognizable by the data set owner system. In this way, the stand alone device may manipulate the data while maintaining the data set owner's format. Alternatively, the interaction device may store the issuer-owned data on the transaction instrument in any format, provided that the issuer-owned data is provided to the issuer system (or to merchant system) in an issuer system (or merchant system) recognizable format.

It should be noted, that the financial transaction instrument may be issued with or without one or more data sets stored thereon. The financial transaction instrument may be issued using various techniques and practices now known or hereinafter developed wherein an instrument is prepared (e.g., embossed and/or loaded with data) and made available to a user for effecting transactions. Although the present invention may contemplate managing data sets (step 1120) before issuing a financial transaction instrument (step 1110), in various exemplary embodiments, by way of illustration, the data sets are described herein as being managed (step 1120) after issuance (step 1110).

At any time after issuance (step 1110) of the financial transaction instrument, the financial transaction instrument may be used in a commercial transaction. In one exemplary embodiment of the present invention, a user communicates with a merchant, indicates a desire to participate in a issuer provided consumer program. The user may communicate with the merchant by, for example, presenting the transaction instrument to the merchant and indicting a desire to complete a transaction. The user may indicate his desire to complete a transaction using any conventional process used by the merchant. The user may further indicate that the user wished to complete the transaction using the financial transaction instrument.

During completion of the transaction, the user may present the financial transaction instrument to a merchant system. The financial transaction instrument is configured to communicate with the merchant, using any conventional method for facilitating a transaction over a network.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received from a data set owner via any communication method described herein. The header or trailer may be appended to a data set to be modified, added or deleted, to indicate the action to be taken relative to the data set. The data set owner may provide the to a stand alone interaction device configured to add, delete, modify, or augment the data in accordance with the header or trailer. As such, in one exemplary embodiment, the header or trailer is not stored on the transaction device along with the associated issuer-owned data but instead the appropriate action may be taken by providing to the transaction instrument user at the stand alone device, the appropriate option for the action to be taken. However, the present invention contemplates a data storage arrangement wherein the header or trailer, or header or trailer history, of the data is stored on the transaction instrument in relation to the appropriate data.

In various exemplary embodiments, the steps of adding, deleting, augmenting and/or modifying data sets may be repeated. For example, first, second, and additional data sets may be added (step 1130) to the financial transaction instrument in any order. In one exemplary embodiment of the present invention, the first data set is owned by a first data set owner (i.e., first issuer) and the second data set is owned by a second data set owner (i.e., second issuer). Furthermore, the system may include replacing a first data set with a subsequent data set by deleting a data set (step 1150), then adding a data set (step 1130).

Figure 7:
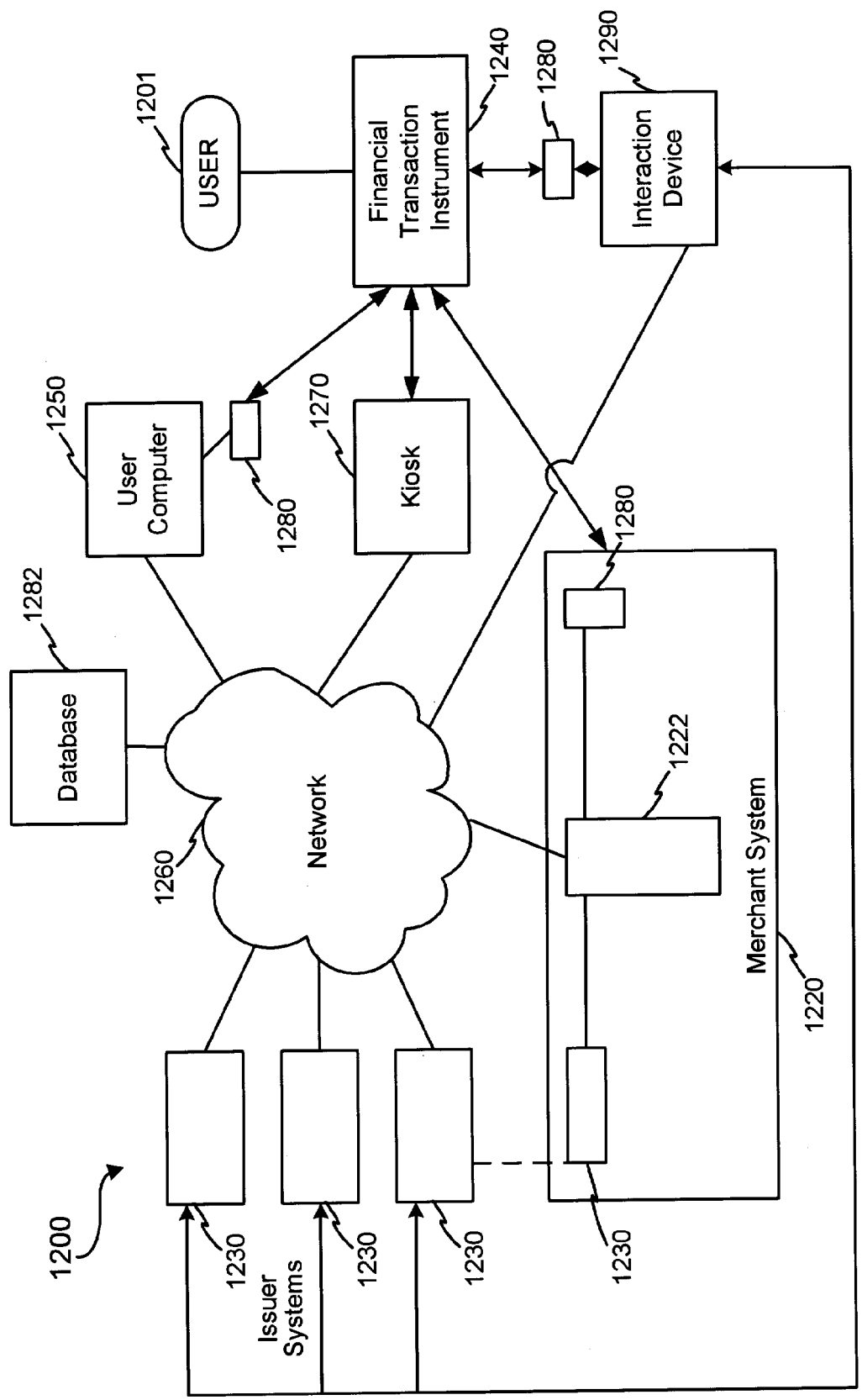
FIG. 7 illustrates a block diagram overview of an exemplary data set management system in accordance with an exemplary embodiment of the present invention.

With reference now to FIG. 7, in one exemplary embodiment of the present invention, a data set management system ("management system") 1200 comprises a merchant system 1220, various issuer systems 1230, and a financial transaction instrument 1240. Management system 1200 may further be accessed by a user 1201 on a self-service interaction device, such as, for example, user computer 1250 or via a transaction device such as, for example, kiosk 1270, stand alone interaction device 1290, automated teller, or the like. In these examples, communications between user computer 1250 or kiosk 1270 and merchant system 1220 or issuer systems 1230 may take place via, for example, a network 1260. In various embodiments, merchant system 1220, user computer 1250 and/or kiosk 1270 are configured to communicate with financial transaction instrument 1240. For example, communication with the financial transaction instrument 1240 may be facilitated by a point of read/write device 1280, such as a merchant point of sale, merchant RFID reader, computer interface, or the like, configured to receive information provided by the financial transaction instrument 1240.

In general, merchant system 1220 is configured to interact with a user 1201 attempting to complete a transaction, and to communicate transaction data to one or more of issuer systems 1230. Issuer systems 1230 are configured to interact with financial transaction instrument 1240 to receive and/or exchange data facilitating a transaction. Merchant system 1220 may be operated, controlled and/or facilitated by any merchant that accepts payment via a transaction instrument.

Merchant system 1220 is configured to facilitate interaction with user 1201, which may be any person, entity, software and/or hardware. The user 1201 may communicate with the merchant in person (e.g., at the box office), or electronically (e.g., from a user computer 1250 via network 1260). During the interaction, the merchant may offer goods and/or services to the user 1201. The merchant may also offer the user 1201 the option of completing the transaction using a financial transaction instrument. The merchant system may provide the options to the user 1201 using interactive user interface, suitable website or other Internet-based graphical user interface that is accessible by users.

Each user 1201 may be equipped with a computing system to facilitate online commerce transactions. For example, the user 1201 may have a computing unit in the form of a personal computer (e.g., user computer 1250), although other types of computing units may be used including laptops, notebooks, hand held computers, set-top boxes, and/or the like. The merchant system 1220 may have a computing unit 1222 implemented in the form of a computer-server, although other implementations are possible. The issuer system 1230 may have a computing center such as a main frame computer. However, the issuer computing center may be implemented in other forms, such as a mini-computer, a PC server, a network set of computers, or the like.

Issuer system 1230 may be configured to manipulate a transaction account associated with the corresponding issuer-owned data stored on the transaction instrument 1240 (or database 1282, discussed below) in accordance with a related transaction. For example, the issuer system 1230 may receive "transaction information" and manipulate an account status or balance in accordance with the information received. In accordance with the transaction amount, the issuer system 1230 may, for example, diminish a value available for completing a transaction associated with the account, or the issuer system 1230 may alter the information relative to the account user (e.g., demographics, personal information, etc.).

It should be noted that issuer systems 1230 may also be configured to interact with financial transaction instrument 1240, directly or indirectly via database 1282 or stand alone interaction device 1290, to individually manage data sets on financial transaction instrument 1240. For example, issuer systems 1230 may manage data sets on database 1282. In some embodiments, the data sets on database 1282 may then be stored on financial transaction instrument 1240 when the transaction instrument is presented. In other embodiments, issuer systems 1230 may store data set information within their own systems which may communicate with the financial transaction instrument via user computer 1250, kiosk 1270, or merchant system 1220. In such embodiments, the issuer system 1230 may be configured to push the data set to the financial transaction instrument 1240 via the stand alone interaction device 1290, or the merchant system 1220, kiosk 1270, interaction device 1290 or computer 1250 which may be configured to pull such information from the issuer system 1230.

In addition, the data may be manipulated using, for example, a stand alone interaction device 1290 configured to communicate with at least one of the issuer systems 1230 which may or may not be configured to communicate with a merchant system 1220. The interaction device 1290 may communicate with the issuer systems 1230 using any of the aforementioned communication protocols, techniques and data links. The communication between the stand alone interaction device 1290 and the issuer system 1230 may be facilitated by a network 1260. In an exemplary embodiment, the network 1260 may be secure against unauthorized eavesdropping.

Interaction device 1290 may provide instructions to the issuer systems 1230 for requesting receipt of issuer-owned data, such as for example, account data, user member identification data, member demographic data, or the like, which the issuer wishes to store on the financial transaction instrument 1240. The interaction device 1290 may communicate with the issuer systems 1230 using an issuer recognizable communications protocol, language, methods of communication and the like, for providing and receiving data. In one exemplary embodiment, issuer-owned data is received by the interaction device 1290 from issuer systems 1230, and stored onto the financial transaction instrument 1240. The data may be stored or manipulated in accordance with the issuer provided instructions, protocol, storage format, header or trailers received by the interaction device from issuer systems 1230. The issuer-owned data may be stored on the financial transaction device 1240 in any format recognizable by a merchant system 1280, and further recognizable by issuer system 1230. In one exemplary embodiment, the issuer owned data is stored using a issuer system 1230 format which may be later formatted in merchant system 1280 recognizable protocol when provided to the merchant system 1280. In one embodiment, the issuer-owned information is stored on the financial transaction instrument 1240 in the identical format with which it was provided by the issuer system 1230. In that regard, interaction device 1290 may be any device configured to receive issuer-owned data from an issuer system 1230, and write the data to a database, such as, for example, a database on instrument 1240 or database 1282. Further, as described more fully below, the issuer-owned information may also be provided by the issuer 1230 to a remote database 1282 where the information is stored such that it mirrors the corresponding information stored on the transaction instrument 1240.

Interaction device 1290 may be initialized prior to use. For example, the interaction device 1290 may be any system which may be initialized ("configured") to communicate with a merchant system 1280. Where the interaction device is not initialized prior to attempting communications with the merchant system 1280 or transaction instrument 1240, the interaction device 1280 may be initialized at the merchant system 1280 location. The interaction device may be initialized using any conventional method for configuring device communication protocol.

As noted, in accordance with the invention a transaction instrument is provided which permits the storage and presentment of at least one of a plurality of data sets for completing a transaction. The data sets may be stored on the transaction device itself, or on a remote database, as described below. The data sets stored with regard to the transaction instrument may be modified, deleted, added or augmented, as required by the issuer or the user. For example, as owner of the data, an issuer may modify a data set at the issuer's discretion. The issuer may modify the data, data subsets, member identifier and/or applications or data sets associated with its transaction account program. Such modifications may be completed or substantially completed in substantially real-time or at a later date, for example, when the transaction instrument is next presented.

In a typical example of issuer modification of the data sets, one or more data sets may be modified by the issuer system 1230 directly via the issuer systems 1230, upon presentment of the financial transaction instrument 1240 to the system 1230. That is, the user 1201 may present the card to the issuer system 1230, and the issuer system 1230 may modify the issuer data stored thereon, using any issuer defined protocol. Alternatively, the modifications, or instructions for modification, may be initiated at the issuer system 1230, and provided to the network 1260. The modifications and/or modification instructions may additionally be provided to a suitable device configured to communicate with the transaction instrument 1240, receive information regarding the data stored on instrument 1240, and to write or overwrite the information contained on instrument 1240. For example, as noted, interaction device 1290 is a suitable interaction device which may be used to provide information to the transaction instrument 1240 to modify the information stored thereon. Interaction device 1290 may be any device capable of receiving data management instructions from the issuer systems 1230 and for updating the data stored on the transaction instrument 1240, in accordance with the instructions received. In this regard, the interaction device 1290 may include any electronic components, databases, processors, servers and the like which may be used to modify the data stored on instrument 1240 using any suitable data modification protocol as is found in the art. Preferably, the interaction device is configured to modify the data on the transaction device in accordance with a data owner defined protocol.

In one exemplary embodiment, the interaction device 1290, may be configured to modify the transaction instrument's 1240 issuer-owned data when the instrument 1240 is initially configured, prior to providing the instrument 1240 to the user 1201. The interaction device 1290 may additionally be configured to modify the issuer data on the instrument 1240 when the instrument 1240 is next presented, for example, to the stand alone interaction device 1290. In this regard, the interaction device 1290 may receive from multiple distinct issuer systems 1230, via the network 1260, the issuer provided modifications/instructions and may update the instrument 1240 in real-time or substantially real-time. The modifications may be provided to the interaction device 1290 for storage and later use when the instrument 1240 is next presented. Alternatively, the interaction device 1290 may be configured to retrieve the instructions from the issuer system 1230 when the instrument 1240 is next presented to device 1290. Further, where other devices, such as, for example, a kiosk 1270, merchant point of interaction device, or the like, are likewise configured to modify the issuer data on instrument 1240, the invention contemplates that the real-time or substantially real-time modifications noted above may be made using those devices in similar manner as is described with the interaction device 1290.

Alternatively, the device to which the transaction instrument 1240 may be presented, may not be equipped for updating or modifying the data stored on the instrument 1240. For example, merchant system 1220 may be any conventional merchant system which communicates to an issuer system 1230, and which permits a user 1201 to complete a financial transaction, but which is not configured to modify the issuer data contained on the transaction instrument. In general, conventional merchant systems are not configured to write or overwrite data included on the payment devices presented to the merchant system for processing. That is, the merchant system 1220 may include little or no additional software to participate in an online transaction supported by network 1260. Management of the data sets on transaction instrument 1240 may be performed independent of the operation of the merchant system 1220 (e.g., via issuer system 1230 or interaction device 1290). As such, the present invention may require no retrofitting of the merchant system 1220, to accommodate system 1200 operation. Thus, where the merchant system 1220 is not configured to modify the data on the transaction instrument, such modifications may be made as described above with respect to modifications being made at the interaction device 1290 or by the issuer at the issuer 1230 system.

The merchant system 1220, kiosk 1270, interaction device 1290, may include additional means for permitting the transaction instrument user 1201 to self-manage the data stored on the transaction instrument 1240. In this case, the systems 1220, 1270, and 1290 may include an additional user interface for use by the user 1201 to identify the modification action to be taken. Where the systems 1220, 1270, and 1290 are configured to communicate with the instrument 1240 and to modify the data thereon, the modifications may be completed or substantially completed in real-time or substantially real-time. For example, the user 1201 may present the transaction instrument 1240 to one of the systems 1220, 1270, or 1290, provide instructions to the system 1220, 1270, or 1290 for modifying the data on instrument 1240. The instructions may include, for example, "ADD," "DELETE," "MODIFY," and the system 1220, 1270, or 1290 may modify the data stored on the instrument 1240 in accordance therewith. The modifications may be made on the instrument in real-time or substantially real-time, for example, prior to permitting the instrument 1240 to be used by the user 1201. Alternatively, the modifications or instructions for modification may be provided by the user 1201 to the merchant system 1220 or kiosk 1270, and the merchant system 1220 or kiosk 1270 may further provide the modifications/instructions to the network 1260 for use in later modifying the data. For example, the modifications/instructions may be provided by system 1220 or 1270 to the issuer system 1230 managed by the issuer owning the data to be modified. The issuer system 1230 may provide the modifications to, for example, interaction device 1290, for updating the transaction instrument 1240 when next presented. The modifications/instructions may additionally be provided from the network 1260 to a remote database, where the issuer-owned data corresponding to the transaction device and the issuer may be additionally stored (i.e., database 1282, described below). In one exemplary embodiment, the modifications/instructions may be stored at the issuer system 1230, until such time as the transaction instrument 1240 is next presented to a device configured to modify the data on the instrument. Once presented, the modifications/instructions may be provided to the device (e.g., computer 1250, interaction device 1290, etc.) for modifying the instrument 1240 data.

In another exemplary embodiment, the user 1201 may self-manage the data sets by, for example, modifying the data sets using a conventional computer system 1250, which may be in communication with the network 1260. Computer system 1250 may or may not be configured to interact with financial transaction instrument 1240. Where the computer system 1250 is not configured to interact with the transaction instrument 1240, the user 1201 may provide modifications or instructions to the issuer system 1230 for later use in modifying the corresponding transaction instrument 1240 data, for example, when the instrument 1240 is next presented in similar manner as described above. Where the computer 1250 is configured to interact with the financial instrument 1240 to modify the data stored thereon, the user 1201 may provide modifications/instructions to the computer 1250 for modifying the data on the financial instrument in real-time or substantially real-time. That is, the computer 1250 may be configured to interact with, read, add, delete, and/or modify the data sets on the instrument 1240. Consequently, the computer 1250 may receive modifications/instructions from the user 1201 and perform the modifications accordingly, and may modify the data in real-time or substantially real-time. The computer 1250 may additionally be configured to receive authorization of the modifications/instructions from issuer system 1230 prior to making the user 1201 requested changes. In one exemplary arrangement, the user 1201 may provide the modifications/instructions via the network 1260 which may be additionally provided to the issuer system 1230. The issuer system 1230 may receive the user 1201 modifications/instructions and verify whether the identified updates are available to the user 1201 or if the identified updates are valid. If the identified updates are authorized, the issuer system 1230 may update a data storage area associated with the transaction instrument 1240. For example, the issuer system 1230 may update an issuer database (not shown) containing data corresponding to the issuer-owned data associated with the transaction instrument 1240. Alternatively, the issuer system 1230 may provide modifications/instructions to a database positioned remotely to the issuer system 1230 for use in modifying the data stored thereon, which is associated to the transaction instrument 1230. As such, in accordance with the present invention, a user 1201 may self-manage the data via, for example, the user computer 1250, a kiosk 1270, a merchant system 1220, and/or a stand alone interaction device 1290.

In one exemplary method of self-management, a user 1201 logs onto a website via user computer 1250, or onto a stand alone device, such as, for example, interaction device 1290 or kiosk 1270, and selects options for configuring data sets on a financial transaction instrument 1240. The changes may be transmitted to the instrument 1240 via a instrument reader/writer device 1280 configured to communicate the data to instrument 1240. In this context, the reader/writer device 1280 may be any conventional transaction device reader or writer.

As noted, modifications to the data stored on the financial transaction instrument 1240 may be made in real-time or substantially real-time when the instrument 1240 is presented to the interaction device 1290, or to a reader/writer device 1280. However, as noted, various embodiments of the invention include a remote database 1282 in communication with an issuer system 1230 via a network 1260. The remote database 1282 may additionally be in communication with one of the user computer 1250, kiosk 1270, merchant system 1220 and/or the interaction device 1290, for variously receiving modifications or instructions for performing modifications to the data stored thereon. In addition, database 1282 may contain a data storage area which "mirrors" the data stored on transaction instrument 1240. In this context "mirrored" or "mirror" may mean that the data is stored on database 1282 in substantially identical configuration and format as stored on the transaction instrument 1240. As such, the present invention may be configured to permit modifications made to instrument 1240 data to be mimicked on corresponding data locations on database 1282. For example, the user 1201 may self-manage the data on the database 1282 via a user interface in communication with the database 1282 via the network 1260. In one exemplary embodiment, the user 1201 may communicate with a "website" which is used to manage the database 1282, wherein database 1282 is a database including unique locations for storing the issuer provided data and data sets correlative to the data and data sets stored on the transaction instrument 1240. The website may include an account management application which permits the user 1201 to select which user accounts to add, delete, or modify with respect to the instrument 1240. That is, the user 1201 may provide unique identifying information to the user computer 1250 which may be recognized by the system (e.g., issuer system 1230 or remote system managing the database 1282) managing database 1282, thereby permitting the user 1201 to access the data corresponding to the unique identifying information stored on database 1282. Further, prior to permitting modifications to the database 1282, the issuer owning the data may require authorization that such modifications may be performed. Further still, the present invention contemplates that database 1282 may be self-managed by the user 1201 in similar manner, where the merchant system 1220, kiosk 1270 and/or interaction device 1290 are configured to provide modifications/instructions to the issuer systems 1230 and database 1282.

In another exemplary embodiment, database 1282 serves as a temporary or redundant storage space for data sets. Thus, a "mirror image" of the data sets currently on the financial transaction instrument 1240 may be maintained and/or updated at appropriate intervals for facilitating replacement of, for example, a damaged financial transaction instrument 1240. As such, database 1282 may be used, for example, for verifying the validity or accuracy of the information stored on the instrument 1240. Also, changes to one or more data sets may be stored to database 1282 pending an opportunity to update the financial transaction instrument 1240. In various embodiments, such updating may take place in both directions similar to hot sync technology.

As noted, in some exemplary embodiments of the invention, authorization must be obtained from issuer systems 1230 prior to making any modifications to the data contained on instrument 1240 or database 1282. Authorization may be obtained by requesting the authorization during the modification process. Authorization may be given where the user 1201 provides the more appropriate security information, which is verified by the issuer system 1230. The security information may be, for example, a security code granting access to the issuer-owned data on the instrument 1240 or database 1282. For example, a point-of-sale (POS) machine may be configured to allow the input of a code, or an answer to a prompt which is provided to and verified by issuer system 1230. Once verified the modification requested may be made to the data contained on the financial transaction instrument 1240.

It should be noted that the authorization code may be used to permit the user 1201 to select which issuer provided data to utilize for completion of a transaction. For example, a Point of Interaction Device (POI) device may be programmed to search the financial transaction instrument 1240 for a data set containing a particular club membership data set, or to locate all available data sets for providing to a user 1201 display available data sets to the user 1201, thereby permitting the user 1201 to select which data set to use to complete a transaction. If no data set is found, the POI device may alert the user 1201 or prompt the merchant to alert the user 1201 of the possibility of adding issuer-owned data to the financial transaction instrument 1240. A positive response to this alert may cause the POI device to add an issuer data set to the instrument 1240.

It is noted that the user 1201 may already be a member of a membership program managed by an issuer system 1230 in which case the associated user 1201 membership data may be assigned to user 1201 for inclusion on instrument 1240. As such, the user 1201 may be permitted to add the membership data set to the transaction instrument 1240. Alternatively, the user may become a member by selecting to add the membership information to the financial transaction instrument 1240, using the interactive device 1290. In some embodiments, changes made to the data sets stored on the transaction instrument 1240 may be updated to the financial transaction instrument 1240 in real-time or substantially real-time, where the device 1290 is in communication with the instrument 1240. Or the changes may be made the next time the user 1201 presents the financial transaction instrument 1240 to stand alone interaction device 1290 or to a kiosk 1270, merchant system 1220, or the like.

In another exemplary embodiment of the present invention, merchant system 1220, kiosk 1270, and/or user computer 1250 may be configured to interact with financial transaction instrument 1240 via a read/write device 1280. Read/write device 1280 may be any device configured to communicate with financial transaction 1240. In one embodiment, read/write device 1280 is configured to read and write to financial transaction instrument 1240. For example, read/write device 1280 may be a point of interaction magnetic card reader/writer. In another example, where the transaction instrument 1240 includes a RF transmitter/receiver for communicating with system 1200, read/write device 1280 may include a mating transponder configured to receive and transmit issuer-owned data. Read/write device 1280 may be configured to select data sets for use by a merchant using any suitable selection technique including but not limited to proprietary commands or command sequences or use of ISO/IEC 17816-4 application selection sequences (e.g., GET command).

In one exemplary embodiment, management of data sets is facilitated by annotating the data set with a status indicator (e.g., condition header); (e.g., LOADED, INITIALIZED, READY, BLOCKED, REMOVABLE or DELETED).

In this regard, a data set may have a LOADED status when the information related to that data set has been stored in association with the financial transaction instrument 1240, but remains dormant. For example, a credit card account may have been added to the financial transaction instrument 1240 that has not yet been activated. In some instances, the loaded data set needs to be further configured before it is ready to be used. For example, the data set may be modified to include a particular branch in a chain of franchise stores, the identification of a user's 1201 primary care physician, or to reflect a user's 1201 selection of a platinum membership status. In another example, a loyalty program may be added in association with a financial transaction instrument 1240, and the data set marked LOADED. In another example, the user 1201 may interact with a kiosk 1270 or the like to input personal information and configure the loyalty program data set. Once such a data set has been configured, it may be annotated with an INITIALIZED status.

The status of a data set may be set as READY when the data set is ready to be utilized. For example, a user 1201 may enter a secret code to indicate that the user 1201 is ready to use the data set. In one example, the data set may be marked as READY when that data set is first accessed to perform a transaction. It will be noted that in accordance with other embodiments of the present invention, the status of a data set may be set at READY the moment it is loaded to the financial transaction instrument 1240. Furthermore, it is possible to change the status between READY, LOADED, and INITIALIZED, under appropriate circumstances. Thus, the data sets may be managed through any one or more of these states and in various orders.

It may also be desirable to prevent use of a data set and/or the associated functionality for a period of time. Thus, the status indicator may be set to BLOCKED. The setting of the status indicator to BLOCKED may, for example, disable the use of the data set. In one exemplary embodiment, an appropriately configured financial transaction instrument reader is configured to recognize the BLOCKED status indicator when accessing the data set and to prevent use of that data set example.

In addition, for various reasons, a user 1201 may desire to remove a data set from a transaction card 1240. The user 1201 may, for example, desire to use the available space on the transaction card 1240 for other data sets, or may remove the data set for security reasons. Furthermore, circumstances may arise where the owner of the data set desires to remove the data set from one or more transaction devices 1240, such as when a coupon expires. In these instances, the data set may be marked as REMOVABLE. Under these circumstances, the memory associated with the data set is available to receive information associated with future added data sets, but for the moment retains the old data set. A REMOVABLE data set may again be made READY under various configurations.

The REMOVABLE data set may subsequently be removed from the financial transaction instrument 1240 and marked DELETED. A DELETED status indicator may be used to indicate that a portion of the financial transaction instrument 1240 is available to store one or more data sets. It is noted that data sets may be directly deleted without going through the step of making the data set REMOVABLE. In one example, a data set may be removed from the financial transaction instrument 1240 if the security of the account associated with the data set is compromised (e.g., stolen password). Furthermore, as appropriate, the status of data sets may be changed to different states. Under appropriate circumstances one or more of any of the six status indicators LOADED, INITIALIZED, READY, BLOCKED, REMOVABLE, or DELETED or other suitable status indicators may be used to annotate a BLOB or other similar data set.

Although the data sets described herein may be managed without status indicators, nevertheless, such status indicators facilitate management of data. For example, regardless of a first data set owner's ability to interpret the information stored in a data set owned by another party, the first owner may interpret the status indicator to determine whether the data set is LOADED, DELETED, or the like. The determination that a data set is DELETED facilitates the addition of new data sets by independent owners without overwriting other data sets on the financial transaction instrument 1240. In addition, the use of tags or status indicators may facilitate the use of global rules, which may simplify operations and/or commands. Status indicators may also enhance interoperability between data sets. Nevertheless, a data set owner may chose not to use a status indicator even if the opportunity is available.

Figure 8:
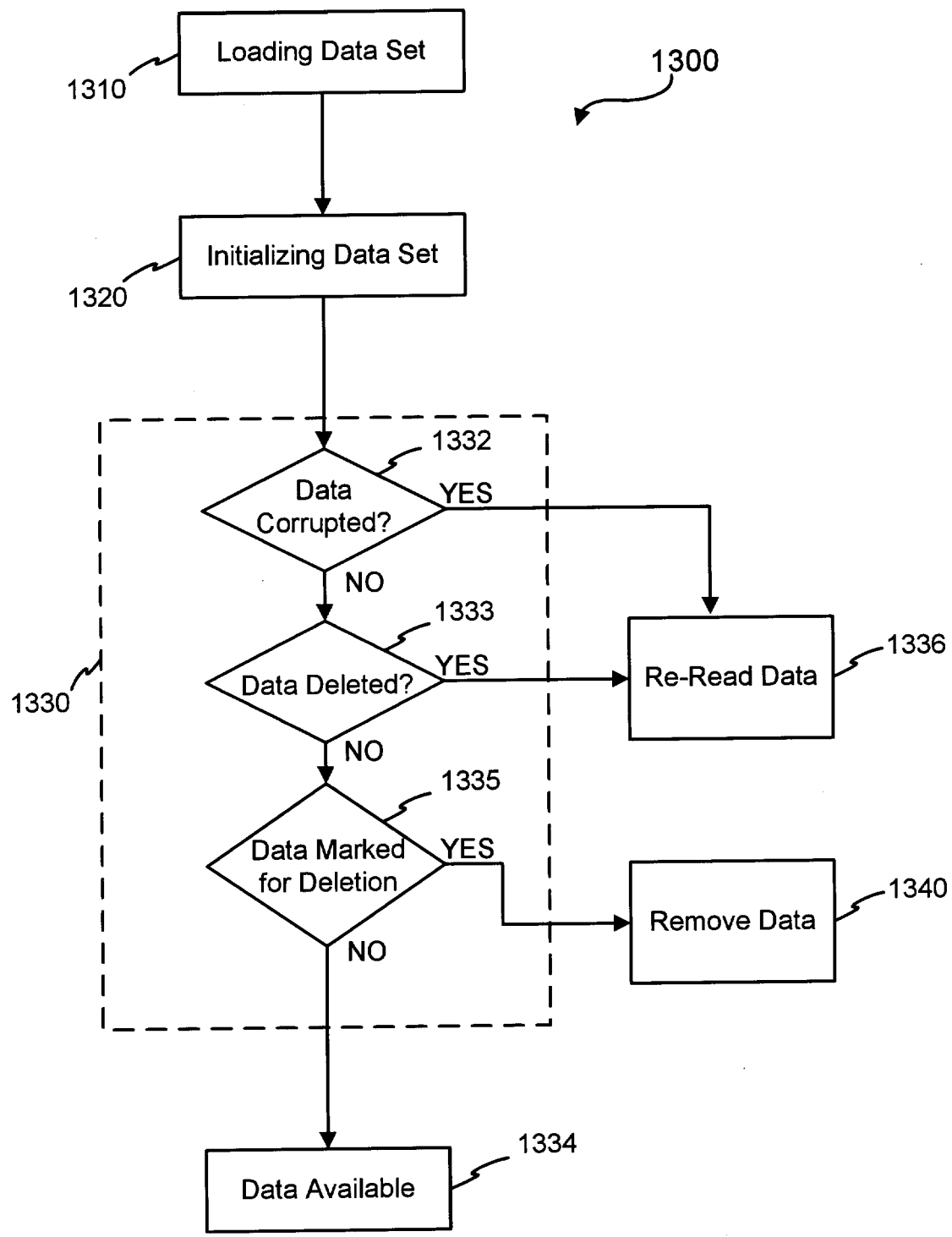
FIG. 8 illustrates a more detailed exemplary data set management method in accordance with an exemplary embodiment of the present invention.

Managing of the data sets (step 1120) may include one or more of the following exemplary steps: add, update, modify, replace, verify, delete and/or the like. More particularly, FIG. 8 illustrates a general overview of an exemplary data set management method 1300 comprising the steps of: loading a data set (step 1310), initializing a data set (step 1320), verifying availability of data set (step 1330), and deleting a data set (step 1340). In this manner, a data set may be added to a financial transaction instrument 1240 and utilized until it is deleted. The adding and deleting steps are described in further detail with reference to FIGS. 9 and 10. Furthermore, the ability to update, modify, replace and/or delete a data set may be subject to security requirements.

In one embodiment, the various processes may include a user 1201 facilitating the input of information into a data management system to cause the data set to be loaded. The information may be inputted via keypad, magnetic stripe, smart card, electronic pointer, touchpad and/or the like, into a user computer 1250, POS terminal, kiosk 1270, ATM terminal and/or directly into the merchant system 1220 via a similar terminal or computer associated with merchant server 1222. The information may be transmitted via any network 1260 discussed herein to merchant system 1220 or issuer systems 1230. In another embodiment, the merchant may enter the information into an issuer system 1230 on behalf to the user 1201. This may occur, for example, when the user 1201 and/or issuer system 1230 authorizes the management of data sets on financial transaction instrument 1240 over a telephone and the service representative inputs the information. In this embodiment, the transaction instrument 1240 may be updated at the next presentment opportunity such as when the user 1201 attempts to compete a transaction using the transaction instrument 1240.

Any suitable procedures may be utilized to determine whether a data set is currently ready for use and available (step 1330). In one example, when a financial transaction instrument 1240 is presented, the availability of the data set is verified by checking whether the data set has been corrupted or blocked (step 1332), or deleted (step 1333). For example, the data set may be checked to determine if the data set has been accessed or altered without permission ("corrupted") or if the data set exists or has been removed from the transaction device 1240 ("deleted"). The check may be performed using any suitable protocol or comparing data. If the answer to these questions is no, then the data set is available and ready for use (step 1334). If the data is corrupted or blocked, subroutines may be used to attempt to retry reading the data (step 1336). If the data set is marked deleted or removable, subroutines will prevent access to the data set (step 1335) and remove the data set (step 1340). For example, a suitable subroutine may place a DELETE "marker" on the data set which prevents the data from being transmitted during completion of a transaction. The data set may then be marked for deletion and deleted from the transaction device 1240 at the next presentment of the device. In similar manner, where the data set is corrupted, a CORRUPTED marker may be appended to the data set and the data set is prevented from being transmitted during completion of a transaction. The marker may be a header or trailer as discussed herein.

Figure 9:
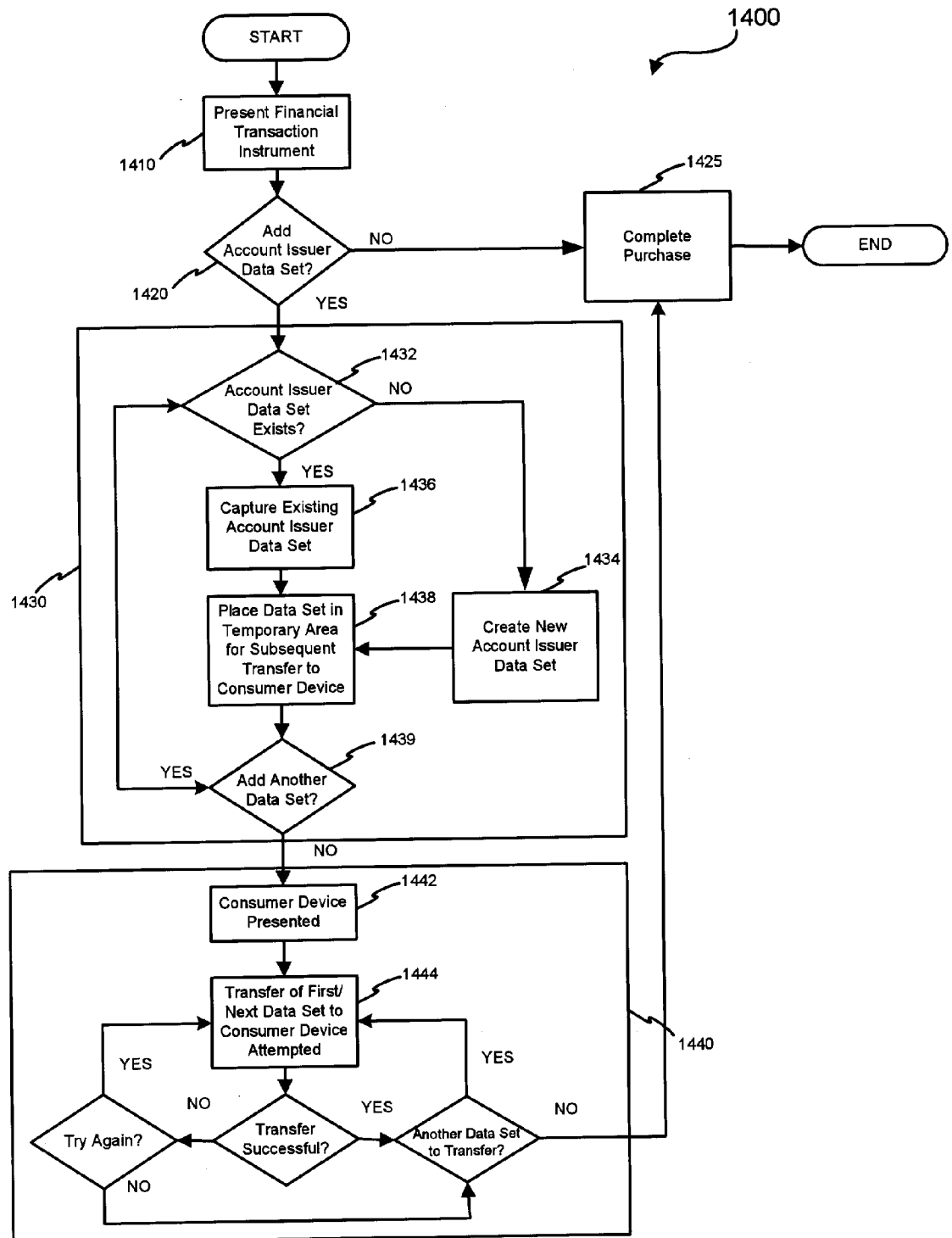
FIG. 9 illustrates an exemplary data set management method for adding data sets in accordance with an exemplary embodiment of the present invention.

Various methods may be used to add a data set to a financial transaction instrument 1240 or to replace a data set on a financial transaction instrument 1240. FIG. 9 illustrates an exemplary method of adding a data set to a financial transaction instrument 1240, including the general steps of presenting the financial transaction instrument (step 1410), verifying the addition of the data set to the financial transaction instrument (step 1420), placing th data set in a temporary holding area (step 1430), and adding the data set (step 1440).

More particularly, the user 1201 presents the financial transaction instrument (step 1410) to a device 1280 configured to communicate with instrument 1240. The user 1201 may present financial transaction instrument 1240 at a point of purchase or to an interaction device 1240 or kiosk 1270. For example, the user 1201 may wave the RF transaction device 1240 in front of a POI machine in a retail store, which is configured to receive data from the device 1240. Alternatively, the user 1201 may present the financial transaction instrument 1240 at a self-service location such as a kiosk 1270 in a mall. Moreover, the user 1201 may present the financial transaction instrument 1240 to a peripheral device associated with a personal computer, or the like.

The user 1201 is then given the opportunity to add a data set to the transaction instrument 1240. For example, device 1280 may detect the absence of a particular data set on the transaction instrument by searching the transaction instrument 1240 data base and comparing the existing data sets to the data set to be added. If the data set to be added is not found on the data base, the user 1201 may be prompted to confirm the addition of this data set to the instrument (step 1420). The user may be prompted via an interactive user interface displaying the option to add the data set. In one example, when a user 1201 presents a financial transaction instrument 1240 to a merchant, the card reader detects the absence of a loyalty data set and provides a message on a display to the user 1201 or the store clerk indicating that the loyalty data set can be added if desired. The user 1201 may answer in the negative and complete the purchase using typical transaction methods (step 1425). Alternatively, if user 1201 provides an affirmative response, the algorithm may prepare a data set for communication with the financial transaction instrument 1240 (step 1430). The process may determine whether the data set (or information that could be used to create the data set) exists in some form or on some device other than on the financial transaction instrument 1240 (step 1432). Determining whether a data set exists may involve querying an issuer system 1230, database 1282, or the like. For example, the issuer system 1230 may compare the data set to other data sets the issuer system 1230 has assigned to a particular user 1201. If the data set is not assigned to a particular user, then issuer system may determine that the data set is available for adding to the transaction instrument 1240. Determining whether a data set exists may also take place when a store clerk verbally asks (or a screen prompts) the user 1201 to present another card containing the information. For example, the data set may exist on a movie rental card and stored in magnetic stripe form, bar code, and/or the like.

If the data set exists in an accessible form, the data set may be captured (step 1436). In this example, the user 1201 may present the movie rental card and the data read from the movie rental card may then be stored in a data set associated with the financial transaction instrument 1240. For example, the user 1201 may desire to add a shopping loyalty card to the user's 1201 financial transaction instrument 1240. The user 1201 may swipe, scan or otherwise present the loyalty card such that the data set from the loyalty card is captured. The system may be further configured such that the merchant, kiosk 1270, or computer system may access an issuer system 1230 to obtain information for creating the data set. Thus, if a user 1201 does not have the movie rental card on the user's 1201 person, the system 1230 may prompt the clerk to request identifying/security information and to access the user's 1201 account and therefore facilitate adding a movie rental data set associated with the user's 1201 transaction instrument 1240. Any other suitable methods of capturing data sets may also be used.

If the data set does not exist, a new data set may be created (step 1434) for inclusion on the transaction instrument 1240. Creation of the data set may, for example, involve filling out an application, providing name and address, creating an account, and/or the like. In either event, the pre-existing or newly created data set is temporarily held in a storage area (e.g., database 1282, local memory or the like) for transfer to the transaction instrument 1240 (step 1438). Additional data sets may be prepared for transmittal to transaction instrument 1240 (step 1439).

In this exemplary embodiment, the transaction instrument 1240 is presented again to read/write device 1280 (step 1442). Read/write device 1280 is configured to attempt to transfer the data set(s) to the transaction instrument 1240 (step 1444). For example, existing read/write device 1280 may be configured with software and/or hardware upgrades to transmit data to the transaction instrument 1240. In one exemplary embodiment, if the data sets were not transferred correctly, the process may try the transfer again. In another exemplary embodiment, data sets are added one at a time or altogether. Thus, a user 1201 may pass a card through a card reader/writer one or more times during the addition process. The transaction may be completed (step 1425) using the new data set or another selected method of payment. The same steps may be used in a self-service embodiment, however, in one embodiment, no financial transaction takes place along with the addition of data sets. It should also be noted that under appropriate circumstances, a user 1201 could add data sets at a point of purchase without actually completing a purchase.

In various exemplary embodiments, the user 1201 and/or the owner of the data set may manage the data set (i.e., steps 1432–439) in advance of presenting the transaction instrument 1240. For example, a user 1201 on user computer 1250 may choose to add or delete data sets via a website configured for management of data sets. In another example, an issuer system 1230 may add functionality to an account and may desire to update the data set associated with that account. In either example, data sets that have been prepared in advance, may be ready for transmission upon presentment of the transaction instrument 1240. The transmission of the data sets may be transparent to the user 1201. For example, the user 1201 may present the transaction instrument 1240 (step 1442) to complete a purchase and the waiting data sets may automatically be added to the user's 1201 card (step 1440).

Similar steps may be taken to replace or update data sets with new information. For example, a user 1201 at a point of interaction may be informed of an upgrade in functionality associated with an account or other data set. Following similar steps as discussed with reference to FIG. 9, the existing data set on the transaction instrument 1240 is replaced with a new data set. Moreover, depending on permission rights and/or hierarchies in place, if any, an existing data set may be replaced with an unrelated data set. Other methods of adding and replacing data sets may also be used to manage data sets on a transaction instrument 1240.

Figure 10:
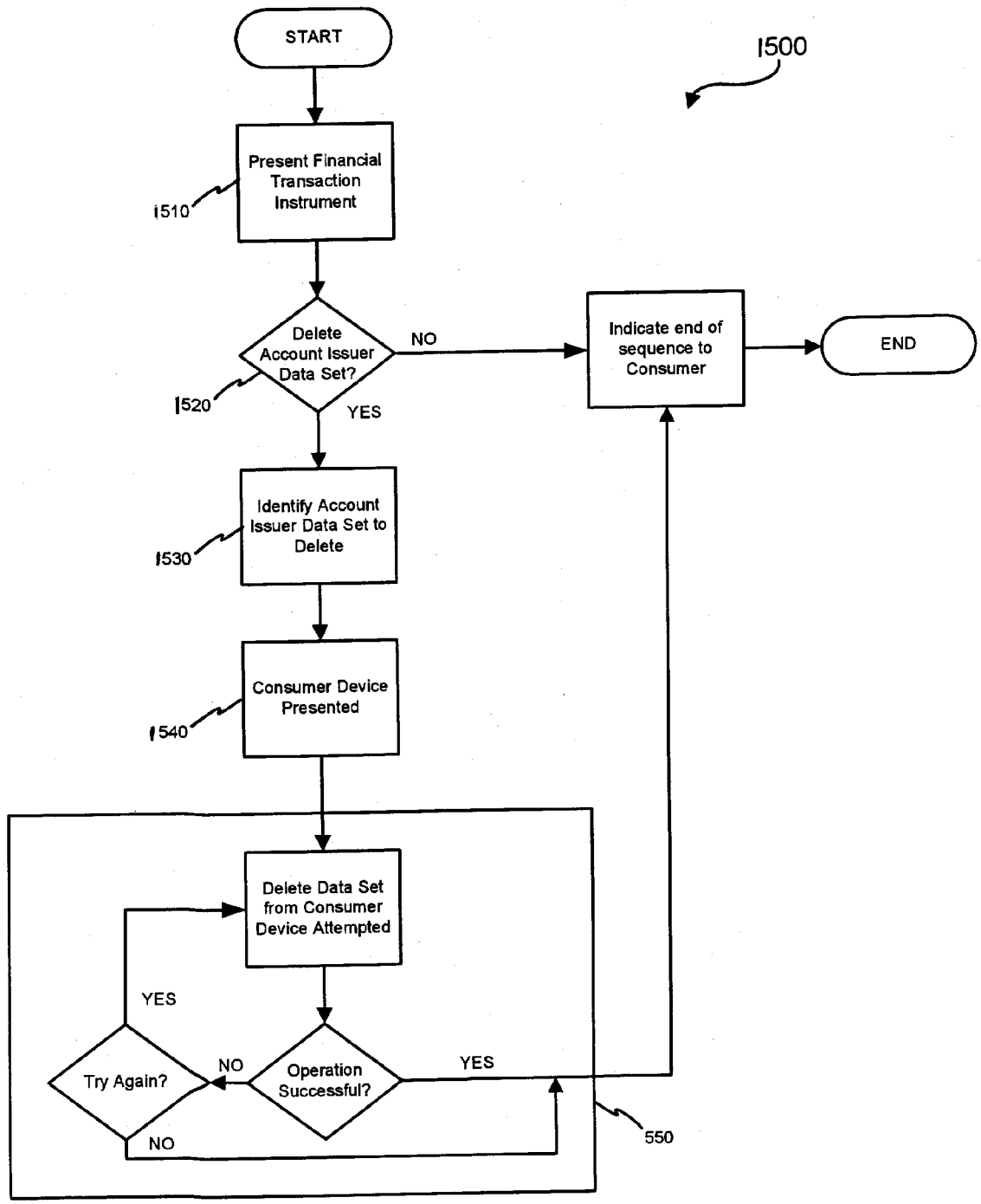
FIG. 10 illustrates an exemplary data set management method for deleting data sets in accordance with an exemplary embodiment of the present invention.

Furthermore, data sets may be deleted using any suitable techniques. For example, FIG. 10 illustrates an exemplary data set deletion method 1500. The user 1201 presents transaction instrument 1240 at a point of purchase, self-service location, or the like (step 1510). The POS device may be configured to facilitate the user 1201 providing input regarding deletion of a data set (step 1520). For example, the POS device may ask the user 1201, via a test screen, whether the user 1201 desires to manage the data sets on the transaction instrument 1240. Through a series of menus and/or questions, the user 1201 may identify data sets that the user 1201 desires to delete.

Furthermore, the POS device may be configured to interrogate a database 1282 or specific issuer systems 1230 to determine whether the deletion of a data set has been requested earlier. If the user 1201 requests deletion of one or more data sets, the data sets are then identified (step 1530). It will be noted that step 1530 may occur concurrently with step 1520 or the user 1201 may request deletion of a specific account at this step. In other embodiments, accounts may be deleted per predefined rules or policies, and/or the like. Upon presenting the transaction instrument 1240 again, the identified data set(s) are removed from the transaction instrument 1240 (steps 1540 and 1550). Other methods of deleting data sets may also be used to manage data sets on a transaction instrument 1240.

In an exemplary embodiment, management of the data sets may further include selecting preferences for use of the data sets. For example, a user 1201 may indicate a desire to use data set A, associated with a low interest rate credit card, as a first option, but to use data set B, associated with a higher interest rate credit card when data set A is not available. In another example, one data set may be used for purchases of gas while another data set may be used for purchasing travel tickets. The consumer data set preferences may be stored on the transaction instrument 1240 as a data set. In this example, when the card is presented, all available data sets are read and the card reader device determines which data sets are to be used based in part on the preferences stored on the card, which preferences may be updated from time to time.

In one exemplary embodiment of the present invention, transaction instrument 1240 is a RF device configured to transmit and receive information via RF frequency. The RF instrument 1240 may be embodied in any form factor allowing presentment of the instrument 1240 for payment. Typical form factors may include a watch, card, FOB, or the like. For ease in understanding, the RF transaction instrument may be referred to, herein, as a "FOB."

The FOB may be configured to communicate via a radio frequency transponder to the merchant systems or account systems. In yet another embodiment, the FOB may be configured to comprise two or more antennae that are both configured to send and receive information and the FOB may be responsive to different RF frequencies. In this exemplary embodiment, each antenna may be configured to communicate using a particular protocol and/or frequency. Thus, the FOB may be configured to communicate with two or more interaction devices 1280 that each communicate with the FOB using different transmission frequencies. For more information on dual antenna FOBs, see U.S. patent application Ser. No. 10/192,488, filed Jul. 19, 2002, by inventors Michael J. Berardi, et al., and entitled "System and Method for Payment Using Radio Frequency Identification in Contact and Contactless Transactions" and its progeny, which are hereby incorporated by reference.

Figure 11:
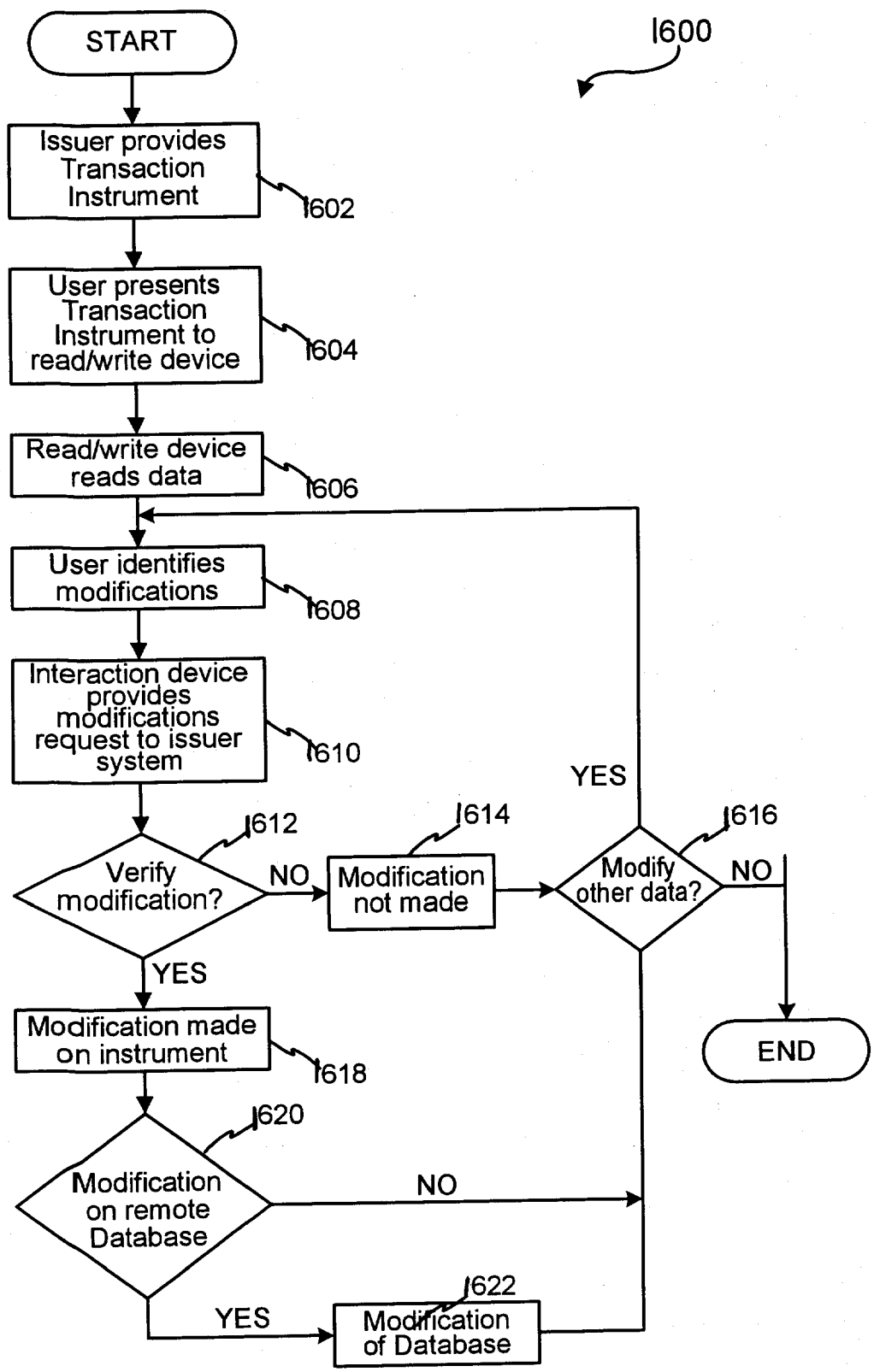
FIG. 11 illustrates an exemplary method for userself-management of data sets in accordance with an exemplary embodiment of the present invention.
Figure 12:
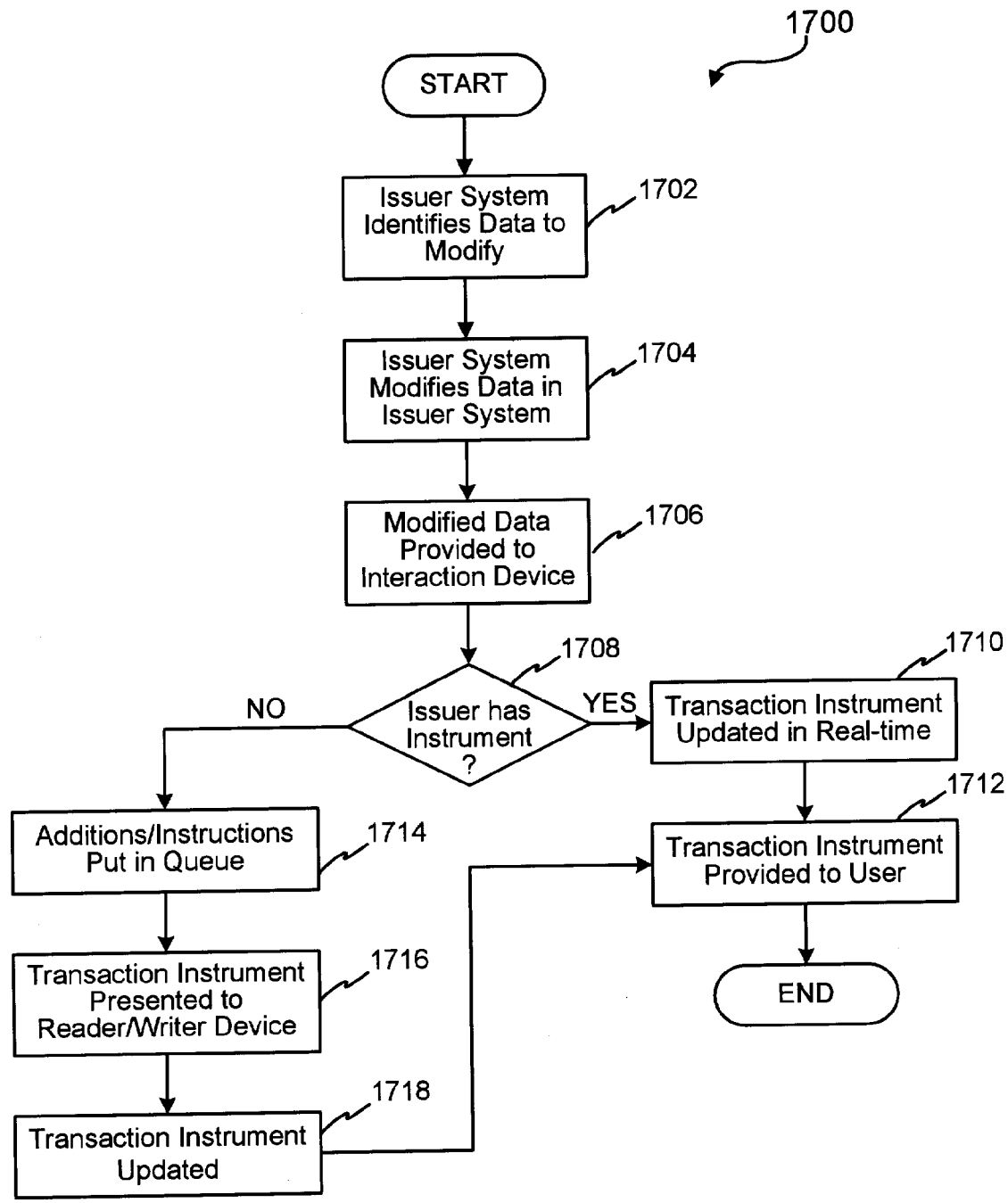
FIG. 12 illustrates an exemplary method for issuer management of data sets in accordance with the present invention.

As noted, the data associated with the transaction instrument 1240 may be modified by the user 1201 and/or by the issuer system 1230. FIGS. 11 and 12 respectively, depict exemplary methods for user 1201 and issuer system 1230 data management. For example, with respect to user 1201 self-management, the issuer system 1230 may provide the user 1201 with a transaction instrument 1240 (step 1602). The instrument 1240 may be provided with pre-stored issuer-owned data, or the instrument 1240 may be configured to permit the user 1201 to add the data at a later date. The user 1201 may the present the transaction instrument 1240 to read/write device 1280 for initiating the self-management process (step 1604). The read/write device 1280 may then read the data on the transaction instrument 1240, and provide the data to an interaction device 1290 for displaying to the user 1201 (step 1606). Alternatively, the interaction device 1290 may provide the user 1201 a list of available data to be added to the instrument 1240.

The user 1201 may then be permitted to identify which data the user 1201 wishes to modify (step 1608). Identification of the data may include providing the data with a trailer or header indicating the action to be taken (e.g., add, delete, augment, overwrite, etc.). The header and an indicator of the data to be modified may then be provided to the issuer system 1230 (step 1610) for verification as to whether such desired modifications are available to the user 1201 (step 1612). If the desired modifications are not available, the modifications will not be made and the user 1201 is notified accordingly (step 1614). The user 1201 may then be permitted to identify whether other data is to be modified (step 1616). If so (step 1608), the interaction device 1290 may provide a request for modification to the issuer system 1203 (step 1610) and the verification process is repeated.

Alternatively, where the issuer system 1230 verifies that the modifications may be made (step 1612), the interaction device 1290 may make the modifications to the appropriate data on the transaction instrument 1240 (step 1618). Additionally, where the system 1200 includes a remote database 1282 for storing a mirror image of the data contained on transaction instrument 1240 (step 1620), the interaction device 1290, or issuer system 1230, may facilitate modification of the remote database 1282 (step 1622). The user 1201 may then be permitted to select other data sets to modify (step 1616), in similar manner as was described above.

In either case, where the modifications are complete, the user 1201 may then present the transaction instrument 1240 to a merchant for use in completing a transaction.

FIG. 12 depicts an exemplary method wherein the issuer system 1230 manages the data contained on the transaction instrument 1240. For example, the issuer may identify on the issuer system 1230 which data sets are to be modified (step 1702). The modifications may then be made to the corresponding data set stored on the issuer system 1230 (step 1706). Where the system 1200 includes a remote database 1282, the issuer system 1230 may provide the modifications/instructions to the database 1282 for updating the database 1282 accordingly (step 1706).

In addition, the issuer system 1230 may query as to whether the issuer system 1230 is in possession of the transaction instrument 1240 for making the modifications to the data set on the instrument 1240 in real-time or substantially real-time (step 1708). If so, the modifications are made accordingly (step 1710) and the instrument 1240 may then be provided to the user 1201 for use in completing a transaction using the distinct data sets modified (step 1712).

Where the issuer system 1230 is not in possession of the transaction instrument 1240 at the time the issuer determines that modifications to the data on the instrument 1240 are to be made (step 1708), the modifications may be made on the issuer system 1230 (step 1704), and may be placed in queue, for uploading to the transaction instrument 1240 when it is next presented to the issuer system 1230 or to an appropriate read/write device 1280 (step 1714). When the transaction instrument 1240 is presented thusly (step 1716), the issuer system 1230 may be notified that the transaction instrument 1240 is available for modifying, and the issuer system 1230 may then provide the instructions for modification (e.g., modified data including headers) to the appropriate read/write device 1280 for modifying the transaction instrument 1240 (step 1718). The transaction instrument 1240 may then be provided to the user 1201 for use in completing a transaction (step 1712).

Figure 13:
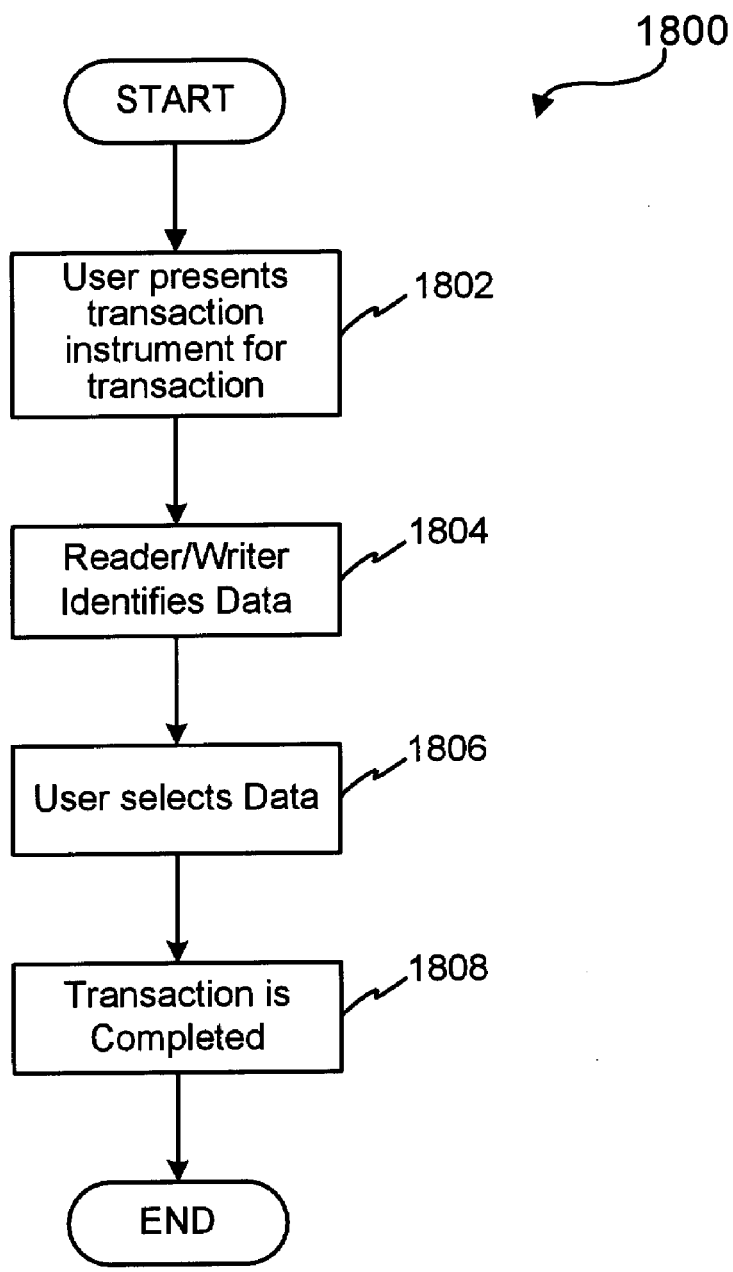
FIG. 13 illustrates an exemplary data set selection method for use in completing a transaction.

As noted, the transaction instrument 1240 may include multiple data sets which correspond to distinct issuer systems 1230, and which may be used to complete a transaction. The user 1201 may be permitted to choose which data set to use for transaction completion. FIG. 13 illustrates an exemplary method by which the user 1201 may choose which of the data sets to use to complete a transaction. For example, the user 1201 may present the instrument 1240 to a merchant system 1220 for use in completing a transaction (step 1802). The merchant system 1220 may then read the data stored on the transaction instrument 1240 and report to the user 1201 all distinct data sets which may be used to complete a transaction (804). The user 1201 may then select the appropriate data set (step 1806) and the transaction is completed accordingly (step 1808).

It should be noted that completion of a transaction may be performed under any business as usual standard employed by the merchant and/or issuer system 1230. For example, the merchant server 1222 may be configured to communicate transaction data to the appropriate issuer system 1230, in real-time or substantially real-time, or by using batch processing at the end of each day. Any suitable means for delivering the transaction data to the issuer systems 1230 may be used. In one exemplary embodiment of the present invention, the transaction data may be delivered to the issuer system 1230 via a network 1260. The issuer system 1230 may receive the transaction information and process the transaction under issuer defined protocol independent of any other protocol used by other issuers to process a transaction. The issuer system 1230 may receive the transaction data and provide the merchant with the appropriate satisfaction for the transaction.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections may be present in a practical data set management system.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

It should be noted that although the present invention is discussed with respect to Internet Service Providers, and systems and networks which may communicate via a leased line (T1, D3, TCP/IP etc.), the invention is not so limited. The present invention contemplates conventional protocol, networks and systems which support a wide range of data transfer. For example, in accordance with this invention, a transaction may be completed using telephone lines connecting long distance carrier systems. In this instance, the issuer-owned data which may be included on transaction instrument 1240 using any of the methods discussed herein, may be an account number which corresponds to long distance calling time such as may be done with a conventional calling card.

Where the transaction instrument 1240 is loaded with several distinct data sets, each corresponding to a distinct data set owner operating on distinct and non-compatible communications network, the user of the transaction instrument 1240 may use the instrument to complete long distance calls on each of the distinct communications network, independently of the other. This is especially useful for a transaction instrument 1240 user who may travel to different locations, where the different locations support different long distance communications network. In this exemplary embodiment, the present invention enables a user to anticipate which communications network is available in many different travel destinations, and include the corresponding mating data set on transaction instrument 1240 prior to beginning travel. In this way, the transaction instrument 1240 user may be prepared to use the transaction instrument 1240 as a long distance calling card irrespective of his anticipated travel destination.

It should be understood, however, that the detailed description and specific examples, while indicating exemplary embodiments of the present invention, are given for purposes of illustration only and not of limitation. Many changes and modifications within the scope of the instant invention may be made without departing from the spirit thereof, and the invention includes all such modifications. The corresponding structures, materials, acts, and equivalents of all elements in the claims below are intended to include any structure, material, or acts for performing the functions in combination with other claimed elements as specifically claimed. The scope of the invention should be determined by the appended claims and their legal equivalents, rather than by the examples given above. For example, the steps recited in any method claims may be executed in any order and are not limited to the order presented in the claims. Moreover, no element is essential to the practice of the invention unless specifically described herein as "critical" or "essential".

The invention claimed is:

1. A method for providing a multiple-service card, the method comprising the steps of:
   receiving at a service partner an application for a multiple-service card from a consumer, said application comprising fields which include credit card application information for a particular credit card and service partner information, said service partner information related at least in part to a private retailer transaction instrument associated with said service partner;
   extracting said service partner information from said application;
   communicating said service partner information to said service partner to determine if said service partner desires to provide access into an establishment of said service partner and to allow purchase of goods and services from said service partner using said particular credit card;
   extracting said credit card application information from said application for the multiple-service card;
   communicating said credit card application information to a provider of credit services, said provider of credit services thereafter determining whether it desires to extend credit to the consumer;
   if said provider of credit services desires to extend credit to the consumer, establishing an account associated with said consumer, and sending the multiple-service card to the consumer, wherein said multiple-service card is configured for providing a primary party's services and a service partner's services, and
   transferring the account to a second service partner, wherein said step of transferring comprises transmitting a file comprising indicia of a service partner account.

2. The method of claim 1 further comprising replacing the multiple-service card, wherein said step of replacing comprises:
   a. requesting a card replacement administrator to create a replacement card;
   b. in response to said step of requesting, said card replacement administrator communicating with a card service engine;
   c. said card service engine communicating account information to a card generator;
   d. said card generator communicating the account information to the service partner; and
   e. said service partner communicating the account information to the card replacement administrator.

3. The method of claim 1 further comprising canceling a service partner private retailer transaction instrument, wherein said step of canceling comprises:
   a. transmitting a file comprising indicia of an account to be canceled,
   b. producing a cancellation report, and
   c. producing a balancing report.

4. The method of claim 1 further comprising canceling a primary party account, wherein said step of canceling comprises:
   a. transmitting a file comprising indicia of an account to be canceled,
   b. producing a cancellation report, and
   c. producing a balancing report.

5. The method of claim 1, further comprising calculating and issuing a rebate on said credit card, wherein said rebate is based upon purchasing products and services at said service partner.

6. The method of claim 1, further comprising assigning a product control number to said application.

7. A transferable, multiple-service card associated with a service partner, a primary party, and a holder, the card comprising:
   a first side and a second side,
   the first side having first indicia associated with said primary party,
   the second side having second indicia associated with said service partner,
   wherein said multiple service card is obtained by:
   receiving at said service partner an application for the multiple-service card from a consumer, said application comprising fields which include credit card application information for a particular credit card and service partner information, said service partner information related at least in part to a private retailer transaction instrument associated with said service partner;
   extracting said service partner information from said application;
   communicating said service partner information to said service partner to determine if said service partner desires to provide access into an establishment of said service partner and to allow purchase of goods and services from said service partner using said particular credit card;
   extracting said credit card application information from said application for a multiple-service card;
   communicating said credit card application information to a provider of credit services, said provider of credit services thereafter determining whether it desires to extend credit to the consumer;
   if said provider of credit services desires to extend credit to the consumer, establishing an account associated with said consumer, and sending the multiple-service card to the consumer, wherein said multiple-service card is configured for providing a primary party's services and a service partner's services; and
   transferring the account to a second service partner by transmitting a file comprising indicia of a service partner account.

8. The multiple-service card of claim 7, said first indicia including an account number, a name of the holder, and an expiration date.

9. The multiple-service card of claim 7, said second indicia including a service partner information.

10. The multiple-service card of claim 7, said second indicia including at least one of a magnetic stripe that accesses an account information, signature block, customer service number, private retailer transaction instrument and an image of the card holder.

11. A method for facilitating management of a plurality of data sets on a transaction instrument, the method comprising the steps of:
   enrolling a first data set owner associated with an open transaction instrument and a second data set owner associated with a private retailer transaction instrument in multiple transaction accounts on a transaction instrument program;

adding to a database on the transaction instrument, a first data set of a first format, before issuance of the transaction instrument by an issuer, wherein said first data set is owned by said first data set owner;

adding to a database on the transaction instrument, a second data set of a second format, after issuance of the transaction instrument, wherein said second data set is owned by said second data set owner, said first owner is distinct from said second owner, and said first format is different from said second format, said first data set is stored in accordance with said first format, and said second data set is stored in accordance with said second format; and modifying at least one of said first and second data set in said database.

12. A method of claim 11, wherein said database is a remote database remote from said transaction instrument.

13. A method of claim 11, wherein said database is a radio frequency database.

14. The method of claim 11, further comprising adding of a first condition header to at least one of said first and second data sets, said header added independent of said first or second format.

15. The method of claim 14, further comprising modification of at least one of said first and second data sets in accordance with said condition header.

16. The method of claim 15, further comprising the step of deleting of said second data set in accordance with said condition header.

17. The method of claim 16, further comprising the steps of: updating of said first data set; and deleting of said first data set from the transaction instrument.

18. The method of claim 17, wherein said first data set is stored in a first memory area and wherein said first memory area is reusable by a third data set after said first data set is deleted from said first memory area.

19. The method of claim 14, further comprising the step of adding of a third data set to the transaction instrument, wherein said third data set is stored, at least partially, in at least a portion of a data storage space that was used to store said second data set.

20. The method of claim 11 further comprising adding, by an interaction device, of a third data set of a third format to the transaction instrument, wherein said third data set is owned by said first owner.

21. The method of claim 11, wherein said first and second data sets are each stored as a block of binary.

22. The method of claim 21, wherein each of said first and second blocks of binary are annotated with at least one status indicator for indicating an action to be taken with the blocks of binary.

23. The method of claim 22, wherein said updating and said deleting of said first data set is accomplished without involving an issuer of the transaction instrument and is independent of any other data set owner.

24. A system for facilitating management of a plurality of data sets stored on a radio frequency transaction instrument, said transaction instrument comprising:

at least one data storage area configured to store a first data set in a first format and a second data storage area configured to store a second data set in a second format different from said first format, said first data set associated with a first owner, wherein said first owner is associated with an open transaction instrument and said data storage area configured to store said first data set in said first format independent of said second data set, and, said second data set associated with a second owner, wherein said second owner is associated with a private retailer transaction instrument and said data storage area configured to store said second data set in said second format independent of said first data set;

a remote database configured to store a duplicate of information in said first data storage area and said second data storage area; and an interaction device configured to read and write data to said transaction device storage area, said interaction device configured to receive said first and second data sets from said remote data base, and to provide said first and second data sets to said transaction instrument data base, wherein at least one of said first and second data sets stored in said remote database is annotated with a condition header.

25. The system of claim 24 wherein at least one of said first and second data sets in said remote database is modified in accordance with said condition header.

26. The system of claim 24 wherein at least one of said first and second data sets in said RF transaction database is modified in accordance with said condition header.

27. The transaction instrument of claim 24, wherein said condition header identifies at least one of the following status conditions: loaded, initialized, ready, blocked, removable, and deleted.

28. The transaction instrument of claim 24, further comprising a first data storage area, wherein said first data storage area is configured to receive data of any format.

29. The transaction instrument of claim 24, wherein said transaction instrument includes a radio frequency operable transponder.

30. A data management system comprising:

a transaction instrument associated with a first data set of a first format and a second data set of a second format, wherein said first data set is owned by a first owner associated with an open transaction instrument and said second data set is owned by a second owner different from the first owner and said second data set is associated with a private retailer transaction instrument, and wherein said transaction instrument is configured to facilitate at least one of a first data set owner and a user of said transaction instrument in managing said first data set without involvement of an issuer of said transaction instrument, and wherein at least one of said first and second data sets is annotated with a condition header;

a database configured to store said first and second data sets, said first data set having a format different from said second format, said database configured to store said first data set in accordance with said first format, and said database configured to store said second data set in accordance with said second format; and an interaction device configured to communicate with said transaction instrument and said database, said interaction device configured to receive said first and second data sets and to provide said first and second data to said transaction instrument.

31. The system of claim 30, wherein said first and second data sets are managed via a self-service user interaction device.

32. The system of claim 30, wherein said interaction device is configured to modify at least one of said first and second data sets according to at least one of the following management actions: adding, updating, and deleting said first data set.

* * * * *